US007990984B2

(12) United States Patent
Carew et al.

(10) Patent No.: US 7,990,984 B2
(45) Date of Patent: *Aug. 2, 2011

(54) SYSTEM AND METHOD FOR COMMUNICATING TELECOMMUNICATION INFORMATION BETWEEN A BROADBAND NETWORK AND A TELECOMMUNICATION NETWORK

(75) Inventors: A. J. Paul Carew, Austin, TX (US); Brendon W. Mills, Austin, TX (US)

(73) Assignee: Genband US LLC, Plano, TX (US)

( * ) Notice: Subject to any disclaimer, the term of this patent is extended or adjusted under 35 U.S.C. 154(b) by 376 days.

This patent is subject to a terminal disclaimer.

(21) Appl. No.: 11/679,741

(22) Filed: Feb. 27, 2007

(65) Prior Publication Data

US 2007/0147401 A1    Jun. 28, 2007

Related U.S. Application Data

(63) Continuation of application No. 09/724,603, filed on Nov. 28, 2000, now Pat. No. 7,184,427.

(51) Int. Cl.
| | |
|---|---|
| H04L 12/28 | (2006.01) |
| H04L 12/56 | (2006.01) |
| H04L 12/66 | (2006.01) |
| H04J 3/16 | (2006.01) |
| H04J 3/22 | (2006.01) |
| G06F 15/16 | (2006.01) |
| H04M 1/00 | (2006.01) |
| H04B 1/38 | (2006.01) |

(52) U.S. Cl. ........ 370/401; 370/354; 370/466; 709/232; 455/560

(58) Field of Classification Search .................... 370/401
See application file for complete search history.

(56) References Cited

U.S. PATENT DOCUMENTS

| | | | |
|---|---|---|---|
| 4,381,427 A | 4/1983 | Cheal et al. | 179/2 DP |
| 4,493,092 A | 1/1985 | Adams | 375/36 |
| 4,504,942 A | 3/1985 | Aro et al. | 370/58 |
| 4,507,793 A | 3/1985 | Adams | 375/36 |
| 4,512,025 A | 4/1985 | Frankel et al. | 375/36 |
| 4,578,537 A | 3/1986 | Faggin et al. | 179/2 DP |
| 4,608,686 A | 8/1986 | Barsellotti | 370/69.1 |
| 4,627,046 A | 12/1986 | Bellamy | 370/58 |
| 4,740,963 A | 4/1988 | Eckley | 370/110.1 |

(Continued)

FOREIGN PATENT DOCUMENTS

EP    0 789 470 A2    8/1997

(Continued)

OTHER PUBLICATIONS

Notice of Allowance and Fee(s) Due for U.S. Appl. No. 11/467,357 (Feb. 4, 2010).

(Continued)

*Primary Examiner* — Andrew Chriss
(74) *Attorney, Agent, or Firm* — Jenkins, Wilson, Taylor & Hunt, P.A.

(57) ABSTRACT

A system for communicating telecommunication information includes a memory, packetization modules, and a telecommunication interface module. The memory stores subscriber profiles associating each of several subscribers with a telecommunication interface. The packetization modules receive data packets from a broadband network and extract telecommunication information associated with a subscriber from the data packets. The telecommunication interface module communicates the telecommunication information to a telecommunication network using a telecommunication interface associated with the subscriber.

20 Claims, 9 Drawing Sheets

U.S. PATENT DOCUMENTS

| | | | |
|---|---|---|---|
| 4,748,656 A | 5/1988 | Gibbs et al. | 379/93 |
| 4,757,497 A | 7/1988 | Beierle et al. | 370/89 |
| 4,843,606 A | 6/1989 | Bux et al. | 370/89 |
| 4,853,949 A | 8/1989 | Schorr et al. | 379/2 |
| 4,881,226 A | 11/1989 | Lechner et al. | 370/110.1 |
| 4,903,292 A | 2/1990 | Dillon | 379/93 |
| 5,033,062 A | 7/1991 | Morrow et al. | 375/7 |
| 5,034,948 A | 7/1991 | Mizutani et al. | 370/79 |
| 5,042,028 A | 8/1991 | Ogawa | 370/58.2 |
| 5,050,164 A | 9/1991 | Chao et al. | |
| 5,127,003 A | 6/1992 | Doll, Jr. et al. | 370/110.1 |
| 5,134,611 A | 7/1992 | Steinka et al. | 370/79 |
| 5,142,568 A | 8/1992 | Ogata et al. | 379/100 |
| 5,142,571 A | 8/1992 | Suzuki et al. | 379/279 |
| 5,151,923 A | 9/1992 | Fujiwara | 375/5 |
| 5,216,704 A | 6/1993 | Williams et al. | 379/93 |
| 5,220,560 A | 6/1993 | Ogasawara | 370/79 |
| 5,247,347 A | 9/1993 | Litteral et al. | 358/85 |
| 5,267,300 A | 11/1993 | Kao et al. | 379/93 |
| 5,305,312 A | 4/1994 | Fornek et al. | 370/62 |
| 5,317,627 A | 5/1994 | Richardson, Jr. et al. | 379/88 |
| 5,341,374 A | 8/1994 | Lewen et al. | 370/85.4 |
| 5,349,640 A | 9/1994 | Dunn et al. | 379/387 |
| 5,367,522 A | 11/1994 | Otani | 370/84 |
| 5,396,494 A | 3/1995 | Roposh | |
| 5,410,343 A | 4/1995 | Coddington et al. | 348/7 |
| 5,426,692 A | 6/1995 | Fujise | 379/93 |
| 5,448,635 A | 9/1995 | Biehl et al. | 379/399 |
| 5,459,788 A | 10/1995 | Kim | 379/399 |
| 5,473,675 A | 12/1995 | Chapman et al. | 379/93 |
| 5,479,407 A | 12/1995 | Ko et al. | |
| 5,479,447 A | 12/1995 | Chow et al. | 375/260 |
| 5,493,609 A | 2/1996 | Winseck, Jr. et al. | 379/96 |
| 5,499,241 A | 3/1996 | Thompson et al. | 370/73 |
| 5,535,198 A | 7/1996 | Baker et al. | 370/60 |
| 5,604,737 A | 2/1997 | Iwami et al. | 370/352 |
| 5,606,553 A | 2/1997 | Christie et al. | 370/394 |
| 5,610,910 A | 3/1997 | Focsaneanu et al. | 370/351 |
| 5,610,922 A | 3/1997 | Balatoni | 370/468 |
| 5,613,069 A | 3/1997 | Walker | 395/200.15 |
| 5,617,423 A | 4/1997 | Li et al. | 370/426 |
| 5,625,404 A | 4/1997 | Grady et al. | 348/7 |
| 5,625,685 A | 4/1997 | Allegranza et al. | 379/399 |
| 5,638,363 A | 6/1997 | Gittins et al. | 370/358 |
| 5,661,785 A | 8/1997 | Carpenter et al. | 379/93.15 |
| 5,668,857 A | 9/1997 | McHale | 379/93.07 |
| 5,671,251 A | 9/1997 | Blackwell et al. | 375/222 |
| 5,673,290 A | 9/1997 | Cioffi | 375/260 |
| 5,675,575 A | 10/1997 | Wall, Jr. et al. | 370/326 |
| 5,692,035 A | 11/1997 | O'Mahony et al. | 379/93 |
| 5,719,870 A | 2/1998 | Baker et al. | 370/463 |
| 5,737,333 A | 4/1998 | Civanlar et al. | 370/352 |
| 5,771,236 A | 6/1998 | Sansom et al. | 370/458 |
| 5,781,547 A | 7/1998 | Wilson | 370/395 |
| 5,781,617 A | 7/1998 | McHale et al. | 379/93.14 |
| 5,787,088 A | 7/1998 | Dagdeviren et al. | 370/493 |
| 5,793,843 A | 8/1998 | Morris | 379/59 |
| 5,828,666 A | 10/1998 | Focsaneanu et al. | 370/389 |
| 5,838,682 A | 11/1998 | Dekelbaum et al. | 370/401 |
| 5,841,840 A | 11/1998 | Smith et al. | 379/93.01 |
| 5,848,150 A | 12/1998 | Bingel | 379/399 |
| 5,862,134 A | 1/1999 | Deng | 370/352 |
| 5,864,747 A | 1/1999 | Clark et al. | 455/3.2 |
| 5,878,120 A | 3/1999 | O'Mahony | 379/93.09 |
| 5,881,142 A | 3/1999 | Frankel et al. | 379/167 |
| 5,883,941 A | 3/1999 | Akers | 379/93.08 |
| 5,889,773 A | 3/1999 | Stevenson, III | 370/352 |
| 5,889,774 A | 3/1999 | Mirashrafi et al. | 370/352 |
| 5,889,856 A | 3/1999 | O'Toole et al. | 379/399 |
| 5,896,377 A | 4/1999 | Boot et al. | 370/352 |
| 5,898,761 A | 4/1999 | McHale et al. | 379/93.01 |
| 5,901,205 A | 5/1999 | Smith et al. | 379/93.01 |
| 5,905,781 A | 5/1999 | McHale et al. | 379/93.14 |
| 5,907,548 A | 5/1999 | Bernstein | 370/353 |
| 5,917,814 A | 6/1999 | Balatoni | 370/352 |
| 5,936,952 A | 8/1999 | Lecomte | 370/352 |
| 5,940,479 A | 8/1999 | Guy et al. | 379/93.01 |
| 5,943,404 A | 8/1999 | Sansom et al. | 379/93.06 |
| 5,949,763 A | 9/1999 | Lund | 370/261 |
| 5,974,043 A | 10/1999 | Solomon | 370/352 |
| 5,978,390 A | 11/1999 | Balatoni | 370/540 |
| 5,982,767 A | 11/1999 | McIntosh | 370/352 |
| 5,991,292 A | 11/1999 | Focsaneanu et al. | 370/352 |
| 5,999,565 A | 12/1999 | Locklear, Jr. et al. | 375/222 |
| 5,999,598 A | 12/1999 | Henrick et al. | 379/93.07 |
| 6,002,689 A * | 12/1999 | Christie et al. | 370/401 |
| 6,034,953 A | 3/2000 | Smith, Jr. | |
| 6,075,784 A | 6/2000 | Frankel et al. | 370/356 |
| 6,075,796 A | 6/2000 | Katseff et al. | 370/466 |
| 6,078,580 A | 6/2000 | Mandalia et al. | 370/352 |
| 6,081,517 A | 6/2000 | Liu et al. | 370/352 |
| 6,101,182 A | 8/2000 | Sistanizadeh et al. | 370/352 |
| 6,104,711 A | 8/2000 | Voit | |
| 6,112,084 A | 8/2000 | Sicher et al. | 455/426 |
| 6,118,780 A | 9/2000 | Dunn et al. | 370/355 |
| 6,125,113 A | 9/2000 | Farris et al. | 370/389 |
| 6,125,127 A | 9/2000 | Smith, Jr. | |
| 6,130,879 A | 10/2000 | Liu | 370/230 |
| 6,130,883 A | 10/2000 | Spear et al. | 370/328 |
| 6,134,235 A | 10/2000 | Goldman et al. | 370/352 |
| 6,141,339 A | 10/2000 | Kaplan et al. | 370/352 |
| 6,144,667 A | 11/2000 | Doshi et al. | 370/401 |
| 6,144,670 A | 11/2000 | Sponaugle et al. | 370/401 |
| 6,154,445 A | 11/2000 | Farris et al. | 370/237 |
| 6,157,637 A | 12/2000 | Galand et al. | 370/356 |
| 6,167,042 A | 12/2000 | Garland et al. | 370/354 |
| 6,175,562 B1 | 1/2001 | Cave | 370/352 |
| 6,175,854 B1 | 1/2001 | Bretscher | 709/201 |
| 6,181,694 B1 | 1/2001 | Pickett | 370/353 |
| 6,181,715 B1 | 1/2001 | Phillips et al. | 370/493 |
| 6,192,044 B1 | 2/2001 | Mack | |
| 6,195,423 B1 | 2/2001 | Smock et al. | |
| 6,201,562 B1 * | 3/2001 | Lor | 348/14.01 |
| 6,201,806 B1 | 3/2001 | Moffett | 370/356 |
| 6,205,139 B1 | 3/2001 | Voit | |
| 6,208,639 B1 | 3/2001 | Murai | 370/356 |
| 6,215,790 B1 | 4/2001 | Voit et al. | |
| 6,215,796 B1 | 4/2001 | Smith, Jr. | |
| 6,222,829 B1 | 4/2001 | Karlsson et al. | 370/329 |
| 6,229,810 B1 | 5/2001 | Gerszberg et al. | 370/401 |
| 6,229,846 B1 * | 5/2001 | Lassig et al. | 375/222 |
| 6,236,653 B1 | 5/2001 | Dalton et al. | 370/352 |
| 6,240,084 B1 | 5/2001 | Oran et al. | 370/352 |
| 6,240,085 B1 | 5/2001 | Iwami et al. | 370/352 |
| 6,243,377 B1 | 6/2001 | Phillips et al. | 370/354 |
| 6,243,398 B1 | 6/2001 | Kahane et al. | 370/522 |
| 6,259,695 B1 * | 7/2001 | Ofek | 370/389 |
| 6,259,708 B1 | 7/2001 | Cheng et al. | 370/493 |
| 6,262,979 B1 | 7/2001 | Anderson et al. | 370/267 |
| 6,285,671 B1 | 9/2001 | Bossemeyer et al. | |
| 6,335,936 B1 | 1/2002 | Bossemeyer et al. | |
| 6,370,149 B1 | 4/2002 | Gorman et al. | |
| 6,404,746 B1 | 6/2002 | Cave et al. | |
| 6,411,704 B1 | 6/2002 | Pelletier et al. | |
| 6,438,218 B1 | 8/2002 | Farris et al. | |
| 6,504,838 B1 * | 1/2003 | Kwan | 370/352 |
| 6,512,764 B1 | 1/2003 | Carew et al. | |
| 6,522,352 B1 | 2/2003 | Strandwitz et al. | |
| 6,526,046 B1 | 2/2003 | Carew | |
| 6,542,497 B1 | 4/2003 | Curry et al. | |
| 6,546,003 B1 | 4/2003 | Farris | |
| 6,546,016 B1 | 4/2003 | Gerszberg et al. | |
| 6,553,568 B1 * | 4/2003 | Fijolek et al. | 725/111 |
| 6,560,222 B1 | 5/2003 | Pounds et al. | |
| 6,560,234 B1 * | 5/2003 | Ben-Michael et al. | 370/401 |
| 6,563,829 B1 | 5/2003 | Lyles et al. | |
| 6,678,253 B1 | 1/2004 | Heath, Jr. et al. | |
| 6,819,664 B1 | 11/2004 | Jeong | |
| 6,839,342 B1 | 1/2005 | Parham et al. | |
| 6,985,492 B1 * | 1/2006 | Thi et al. | 370/429 |
| 7,099,310 B1 | 8/2006 | Carew et al. | |
| 7,325,058 B1 * | 1/2008 | Sheth et al. | 709/225 |
| 7,385,963 B1 | 6/2008 | Carew et al. | |
| 7,738,449 B2 | 6/2010 | Carew et al. | |
| 7,739,383 B1 * | 6/2010 | Short et al. | 709/226 |

| | | | |
|---|---|---|---|
| 2001/0036192 | A1* | 11/2001 | Chiles et al. ................. 370/401 |
| 2002/0057701 | A1 | 5/2002 | Mills |
| 2002/0064139 | A1 | 5/2002 | Bist et al. |

FOREIGN PATENT DOCUMENTS

| | | |
|---|---|---|
| EP | 0 841 831 A2 | 5/1998 |
| GB | 2 313 979 A1 | 10/1997 |
| WO | WO 97/23078 | 6/1997 |
| WO | WO 97/37458 | 10/1997 |
| WO | WO 98/42104 | 9/1998 |
| WO | WO 99/49608 | 9/1999 |
| WO | WO 00/56050 | 9/2000 |
| WO | WO 00/69131 | 11/2000 |
| WO | WO 01/05130 A1 | 1/2001 |
| WO | WO 01/06720 | 1/2001 |
| WO | WO 01/13593 A1 | 2/2001 |
| WO | WO 01/13618 A1 | 2/2001 |

OTHER PUBLICATIONS

Interview Summary for U.S. Appl. No. 11/467,357 (Oct. 9, 2009).
Official Action for U.S. Appl. No. 11/467,357 (May 21, 2009).
Notice of Panel Decision From Pre-Appeal Brief Request for U.S. Appl. No. 11/467,357 (Mar. 16, 2009).
Advisory Action for U.S. Appl. No. 11/467,357 (Oct. 6, 2008).
Final Official Action for U.S. Appl. No. 11/467,357 (Jul. 7, 2008).
Notice of Allowance and Fee(s) Due for U.S. Appl. No. 09/724,714 (Feb. 8, 2008).
Official Action for U.S. Appl. No. 11/467,357 (Jan. 11, 2008).
Official Action for U.S. Appl. No. 09/724,714 (Aug. 10, 2007).
Notice of Panel Decision From Pre-Appeal Brief Review for U.S. Appl. No. 09/724,714 (May 29, 2007).
Advisory Action for U.S. Appl. No. 09/724,714 (Jan. 31, 2007).
Final Official Action for U.S. Appl. No. 09/724,714 (Nov. 15, 2006).
Notice of Allowance and Fee(s) Due for U.S. Appl. No. 09/724,603 (Oct. 26, 2006).
Official Action for U.S. Appl. No. 09/724,714 (May 5, 2006).
Notice of Allowance and Fee(s) Due for U.S. Appl. No. 09/491,299 (Apr. 24, 2006).
Notice of Panel Decision From Pre-Appeal Brief Request for U.S. Appl. No. 09/724,603 (Mar. 15, 2006).
Advisory Action for U.S. Appl. No. 09/491,299 (Feb. 17, 2006).
Advisory Action for U.S. Appl. No. 09/724,603 (Jan. 5, 2006).
Advisory Action for U.S. Appl. No. 09/724,714 (Dec. 28, 2005).
Final Official Action for U.S. Appl. No. 09/491,299 (Dec. 2, 2005).
Final Official Action for U.S. Appl. No. 09/724,603 (Sep. 27, 2005).
Final Official Action for U.S. Appl. No. 09/724,714 (Sep. 7, 2005).
Official Action for U.S. Appl. No. 09/491,299 (May 19, 2005).
Official Action for U.S. Appl. No. 09/724,603 (Feb. 23, 2005).
Official Action for U.S. Appl. No. 09/724,714 (Feb. 8, 2005).
Advisory Action for U.S. Appl. No. 09/491,299 (Dec. 27, 2004).
Final Official Action for U.S. Appl. No. 09/724,714 (Sep. 20, 2004).
Final Official Action for U.S. Appl. No. 09/491,299 (Sep. 15, 2004).
Official Action for U.S. Appl. No. 09/724,603 (Jun. 24, 2004).
Advisory Action for U.S. Appl. No. 09/724,603 (Apr. 5, 2004).
Official Action for U.S. Appl. No. 09/724,714 (Apr. 2, 2004).
Final Official Action for U.S. Appl. No. 09/724,603 (Dec. 31, 2003).
Official Action for U.S. Appl. No. 09/491,299 (Dec. 18, 2003).
Official Action for U.S. Appl. No. 09/724, 714 (Jul. 7, 2003).
Official Action for U.S. Appl. No. 09/724,603 (Jun. 20, 2003).
Notice of Allowability for U.S. Appl. No. 09/356,250 (Nov. 18, 2002).
Notice of Allowance and Fee(s) Due for U.S. Appl. No. 09/356,250 (Aug. 27, 2002).
Notification of Transmittal of the International Search Report or the Declaration for International Application No. PCT/US01/44491 (Jun. 3, 2002).
Advisory Action for U.S. Appl. No. 09/356,250 (Mar. 19, 2002).
Final Official Action for U.S. Appl. No. 09/356,250 (Dec. 18, 2001).
Unknown, "Telogy Networks' Over Packet White Paper," http://www.telogy.com/our_products/golden_gateway/VOPwhite.html, 14 pages (Downloaded from the Internet on Aug. 7, 2001).
Unknown Author, "The Role of Voice-Data Integration in Transforming Your Business to e-business," IBM Networking White Papers:
Voice-Data Integration in e-business, http://www.networking.ibm.com/voice/voice-data.html, 23 pages (Downloaded from the Internet on Aug. 7, 2001).
Unknown Author, Press Release, "VOCALTEC Expands Telephony Gateway Product Line With New Eight-line Solution for Corporate Intranets and Internet Service Providers," VolcalTec—The First and the Best, http://www.vocaltec.com/html/news1996/press_11_25.html, 5 pages (Downloaded from the Internet on Aug. 7, 2001).
Unknown Author, Press Release, "VOLCATEC Introduces the Internet Phone Telephony Gateway Linking Traditional and Internet Telephone Networks," VocalTec—The First and the Best, http://www.vocaltec.com/html/news1996/press_03_08.html, 3 pages (Downloaded from the Internet on Aug. 7, 2001).
Unknown Author, Press Release, "VOCALTEC's Telephony Gateway Software Captures 1996 Product of the year Honors From Computer Telephony Magazine," VocalTec—The First and the Best, http://www.vocaltec.com/html/news1996/press_12_18_html, 3 pages (Downloaded from the Internet on Aug. 7, 2001).
Unknown Author, "A Discussion of Voice Over Frame Delay," Voice over FR, http://www.frforum.com/4000/4017052699.html, 10 pages (Downloaded from the Internet on Aug. 7, 2001).
Notification of Transmittal of the International Search Report or the Declaration for International Application No. PCT/US01/00885, pp. 1-7 (Jun. 29, 2001).
Official Action for U.S. Appl. No. 09/356,250 (Jun. 22, 2001).
Notification of Transmittal of the International Search Report or the Declaration for International Application No. PCT/US01/00886, pp. 1-7 (May 2, 2001).
Notification of Transmittal of the International Search Report or the Declaration for International Application No. PCT/US00/19412 (Oct. 19, 2000).
Unknown, "Gateway Control. Protocol," ITU-T Telecommunication Standardization Sector of ITU Series H: Audiovisual and Multimedia Systems, Infrastructure of Audiovisual Services—communication Procedures, ITU-T Recommendation H.248, 224 pages (Jun. 2000).
T.C. Kwok, "Residential Broadband Architecture Over ADSL and B.Lite (G.992.2): PPP Over ATM," XP000830885, IEEE Communication Magazine, 6 pages (May 1999).
Clougherty et al., "The AnyMedia® Access System-Providing Solutins for Distribution and Network," XP000851513, Bell Labs Technical Journal, pp. 98-127 (Apr.-Jun. 1999).
Fossaceca et al., "The PathStar™ Access Server: Facilitating Carrier-Scale Packet Telephony," Bell Labs Technical Journal, 17 pages (Oct. 12, 1998).
Unknown, "Packet-based Multimedia Communications Systems," ITU-T Telecommunicaiton Standardization Sector of ITU, Series H: Audiovisual and Multimedia Systems, Infrastructure of Audiovisual Services—Systems and Terminal Equipment for Audiovisual Services, ITU-T Recommendation H.323, 124 pages (Feb. 1998).
Gudapati et al., "Local Telephone Service for Cable Subscribers Using Packet Switched Access," International Switching Symposium, pp. 325-329 (Sep. 21, 1997).
V.C. Majeti, "A Network Management Model for ADSL-based Broadband Systems," ADSL Forum Network Management Group, Brussels, Belgium, ADSL-Forum 97-112, 4 pages (Sep. 15, 1997).
V.C. Maleti, "Network Management System (NMS) Operations for ADSL-based Broadband Systems," ADSL Forum Network Management Group, Brussels, Belgium, ADSL Forum 97-113, 4 pages (Sep. 15, 1997).
Unknown Author, "Network Migration Working Text," ADSL Forum WT-013, ADSLForum WT013, Draft D, 60 pages (Jul. 8, 1997).
Unknown, "Voice and Telephony Over ATM-ATM Trunking Using AAL1 for Narrowband Services, Version 1.0," The ATM Forum Technical Committee, AF-VTOA-0089.000, 64 pages (Jul. 1997).
Unknown, "Voice and Telephony Over ATM to the Desktop Specification," The ATM Forum Technical Committee, af-vtoa-0083.000, 43 pages (May 1997).
Unknown Author, "Network Migration Working Text,", ADSL Forum WT-013, ADSLForum WT013, Draft C, 55 pages (Apr. 18, 1997).
Unknown, "Cell Signaling Protocols and Media Stream Packetization for Packet Based Multimedia Communications Systems,", ITU-T Telecommunication Standardization Sector of ITU, Line Transmission of Non-Telephone Signals, ITU-T Recommendation H.225.0, Version 2, 141 pages (Mar. 25, 1997).

Unknown Author, "Network Migration Working Text," ADSL Forum WT-013, ADSLForum WT013, Draft B, 53 pages (Jan. 12, 1997).

Unknown Author, "Network Migration Working Text," ADSL Forum WT-00x, ADSLForum 96-116, 32 pages (Dec. 10, 1996).

Unknown, "Visual Telephone Systems and Equipment for Local Area Networks Which Provide a Non-guaranteed Quality of Service," ITU-T Telecommunications Standardization Sector ITU, Series H: Audiovisual and Multimedia Services—Systems and Terminal Equipment for Adiovisual Services, ITU-T Recommendation H.321, 20 pages (Mar. 1996).

Unknown, "Adaptation of H.320 Visual Telephone Terminals to B-ISDN Environments," ITU-T Telecommunication Standardization Sector of ITU, Series H: Transmission of Non-Telephone Signals, Infrastructure of Audiovisual Services—Systems and Terminal Equipment for Audiovisual Services, ITU-T Recommendation H.321, 20 pages (Mar. 1996).

L. Van Hauwermeiren et al., "Offering Video Services Over Twisted Pair Cables to the Residential Subscriber by Means of an ATM Based ADSL Transmission System," ISS Symposium, vol. 1, 5 pages (Apr. 1995).

F. Dawson, Contributing Editor, "Packet-Based Voice, Video Becoming Real Market, New Software, Codecs Make Integration of Voice Over Data Networks More Feasible and Affordable," http://ww.zdnet.com/intweek/print/970303/inwk0006.html, 6 pages (Copyright 1997).

Coronaro et al., "Integrated Office Communication System," Office Communication Ssystem, Electrical Communication—vol. 60, No. 1 (1986).

* cited by examiner

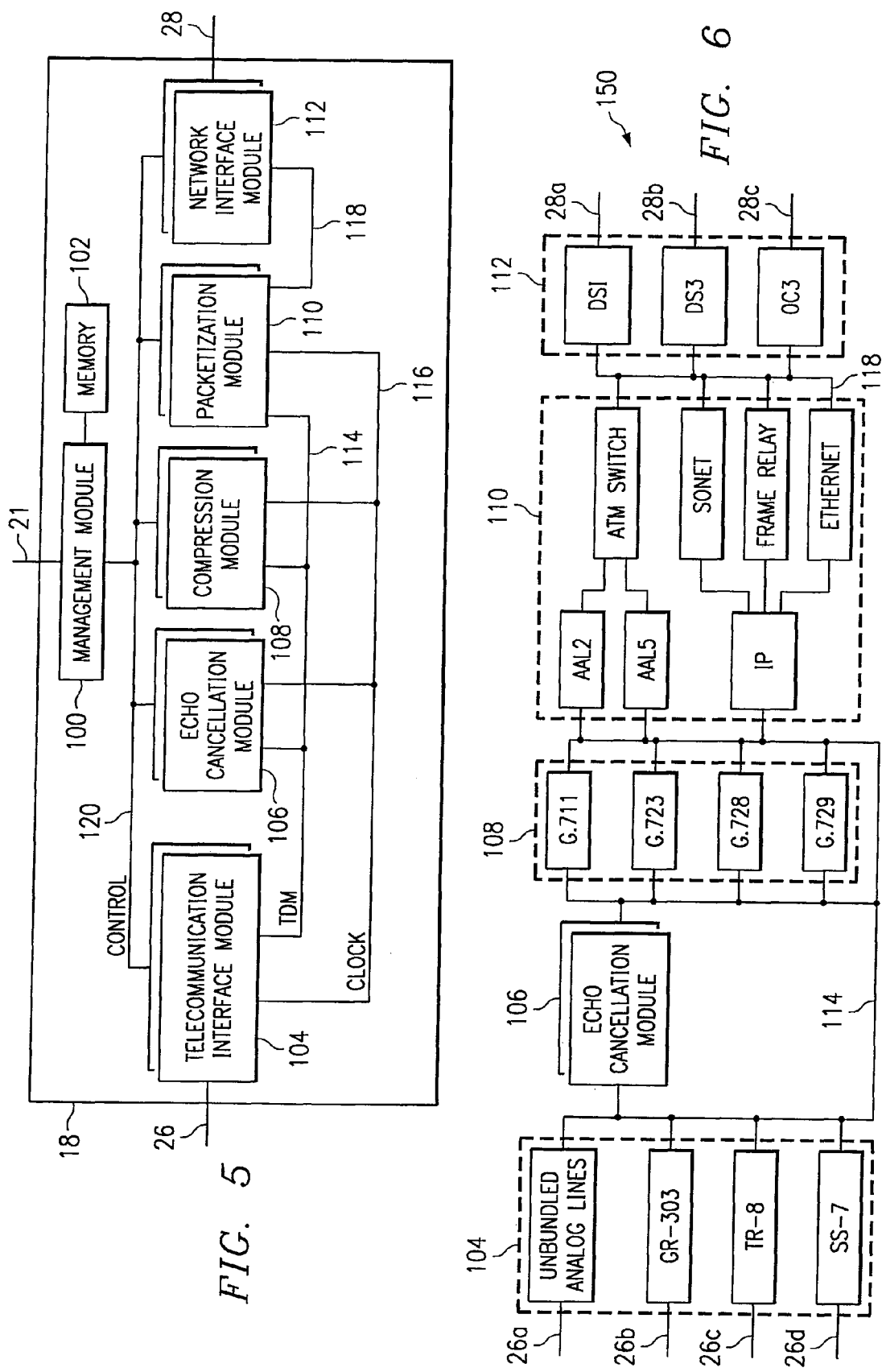

| Subscriber Identifier 202 | Interface 204 | Echo Cancellation 206 | Compression 208 | Data Communication Protocol 210 | Quality of Service 211 | Data Link 212 | Time Slot 214 | Address 216 | Platform 218 | Name 220 |
|---|---|---|---|---|---|---|---|---|---|---|
| 111-111-1111 | GR-303 | YES | G.711 | IP | 1 | OC-3 #4 | 5 | 15.89.75.46 | DSL | JOHN DOE |
| 333-333-3333 | | NO | G.723 | FRAME RELAY | 0 | DS-1 #3 | 9 | 94 | CABLE | JANE DOE |
| | ... | ... | ... | ... | ... | ... | ... | ... | ... | ... |
| 888-888-8888 | SS7 | YES | G.728 | ATM | 2 | DS-3 #7 | 21 | 65 | WIRELESS | JEREMY DOE |

FIG. 7

SYSTEM AND METHOD FOR COMMUNICATING TELECOMMUNICATION INFORMATION BETWEEN A BROADBAND NETWORK AND A TELECOMMUNICATION NETWORK

RELATED APPLICATIONS

This application is a continuation application of U.S. application Ser. No. 09/724,603 and now U.S. Pat. No. 7,184,427, which is incorporated by reference herein.

TECHNICAL FIELD OF THE INVENTION

This invention relates generally to the field of communications and, more particularly, to a system and method for communicating telecommunication information between a broadband network and a telecommunication network.

BACKGROUND OF THE INVENTION

The public switched telephone network (PSTN) is a circuit-switched network that uses dedicated lines to communicate telephone calls. At a central office, a digital Class 5 switch receives analog telephone signals from a user, digitizes the analog telephone signals, and then multiplexes the digital signals over a network of circuit-switched backbone transport lines. An interexchange carrier (IXC) transports the call to a destination Local Access Transport Area (LATA), where it is handed to a local service provider and reconverted to an analog signal for delivery to a second user.

As the Internet has driven demand for greater bandwidth over data networks, new broadband technologies have emerged that allow the delivery of telephone calls using data packets communicated over broadband networks. Unfortunately, current solutions have been technology dependent, supporting only a single architecture.

SUMMARY OF THE INVENTION

In accordance with the present invention, a system and method for communicating telecommunication information between a broadband network and a telecommunication network is provided that substantially eliminates or reduces disadvantages or problems associated with previously developed systems and methods.

In one embodiment, a gateway for communicating telecommunication information includes packetization modules and telecommunication interface modules. The packetization modules receive first data packets from a first broadband network using a first data communications protocol and extract first telecommunication information associated with a first subscriber from the first data packets. The packetization modules also receive second data packets from a second broadband network using a second data communication protocol and extract second telecommunication information associated with a second subscriber from the second data packets. The telecommunication interface modules communicate the first telecommunication information to a telecommunication network using a first telecommunication interface associated with the first subscriber and communicate the second telecommunication information to the telecommunication network using a second telecommunication interface associated with the second subscriber.

In another embodiment, a system for communicating telecommunication information includes a memory, a packetization module, and a telecommunication interface module. The memory stores subscriber profiles associating each of several subscribers with a telecommunication interface. The packetization module receive data packets from a broadband network and extract telecommunication information associated with a subscriber from the data packets using a data communication protocol associated with the subscriber. The telecommunication interface module communicates the telecommunication information to a telecommunication network using a telecommunication interface associated with the subscriber.

In another embodiment, a gateway for communicating telecommunication information includes a telecommunication interface module and packetization modules. The telecommunication interface module receives first telecommunication information for a first subscriber and second telecommunication information for a second subscriber from a telecommunication network. The packetization modules generate first data packets for communicating the first telecommunication information according to a first data communication protocol associated with the first subscriber and generate second data packets for communicating the second telecommunication information according to a second data communication protocol associated with the second subscriber.

In another embodiment, a system for communicating telecommunication information includes a memory, a telecommunication interface module, and a packetization module. The memory stores subscriber profiles associating each of several subscribers with a data communication protocol. The telecommunication interface module receives telecommunication information for a subscriber from a telecommunication network, and the packetization module generates data packets communicating the telecommunication information according to a data communication protocol associated with the subscriber.

In another embodiment, a system for communicating telecommunication information includes a gateway, a digital subscriber line access multiplexer (DSLAM), and a cable modem termination system (CMTS). The gateway associates each of several subscribers with a data communication protocol, receives telecommunication information for subscribers from a telecommunication network, and generates data packets for communicating each subscriber's telecommunication information according to the data communication protocol associated with each subscriber. The DSLAM communicates at least some of the data packets generated by the gateway to an integrated access device (IAD) using a digital subscriber line, and the CMTS communicates at least some of the data packets generated by the gateway to a media terminal adapter (MTA) using a cable link.

The present invention provides a number of important technical advantages. The present invention uses broadband networks to communicates telecommunication information between a telecommunication network and customer premises equipment. Because digital subscriber line (DSL), cable, wireless, and other broadband platforms deliver greater bandwidth than traditional plain old telephone service (POTS), the present invention provides a more efficient means of communicating telecommunication information.

Rather than provide a single, technology-dependent solution, the present invention uses several, alternative telecommunication, compression, and broadband technologies to couple a telecommunication network to a broadband network. For example, the present invention may receive telecommunication information from a telecommunication network using different telecommunication interfaces and compress the telecommunication information using various compression algorithms. In addition, the present invention may generate data packets encapsulating the telecommunication information according to several, alternative data communication protocols and then communicate the data packets to broadband networks using different data links. Because the present invention supports several, alternative telecommunication, compression, and broadband technologies, it is compatible with many different DSL, cable, wireless, and other types of broadband platforms. As a result, telecommunication providers can deploy the present invention with greater flexibility and in a more cost-effective manner. For these and other readily apparent reasons, the present invention represents a significant advance over prior systems and methods.

BRIEF DESCRIPTION OF THE DRAWINGS

For a more complete understanding of the present invention and the advantages thereof, reference is now made to the following description taken in conjunction with the accompanying drawings, in which like reference numerals represent like parts, in which:

FIG. 5 illustrates a gateway that uses several, alternative telecommunication interfaces, data compression algorithms, data communication protocols, and data links to communicate telecommunication information;

FIG. 6 illustrates a configuration of telecommunication interface modules, echo cancellation modules, compression modules, packetization modules, and network interface modules within a gateway;

FIG. 7 illustrates a table of subscriber profiles relating to a gateway; and

DETAILED DESCRIPTION OF THE DRAWINGS

Figure 1:
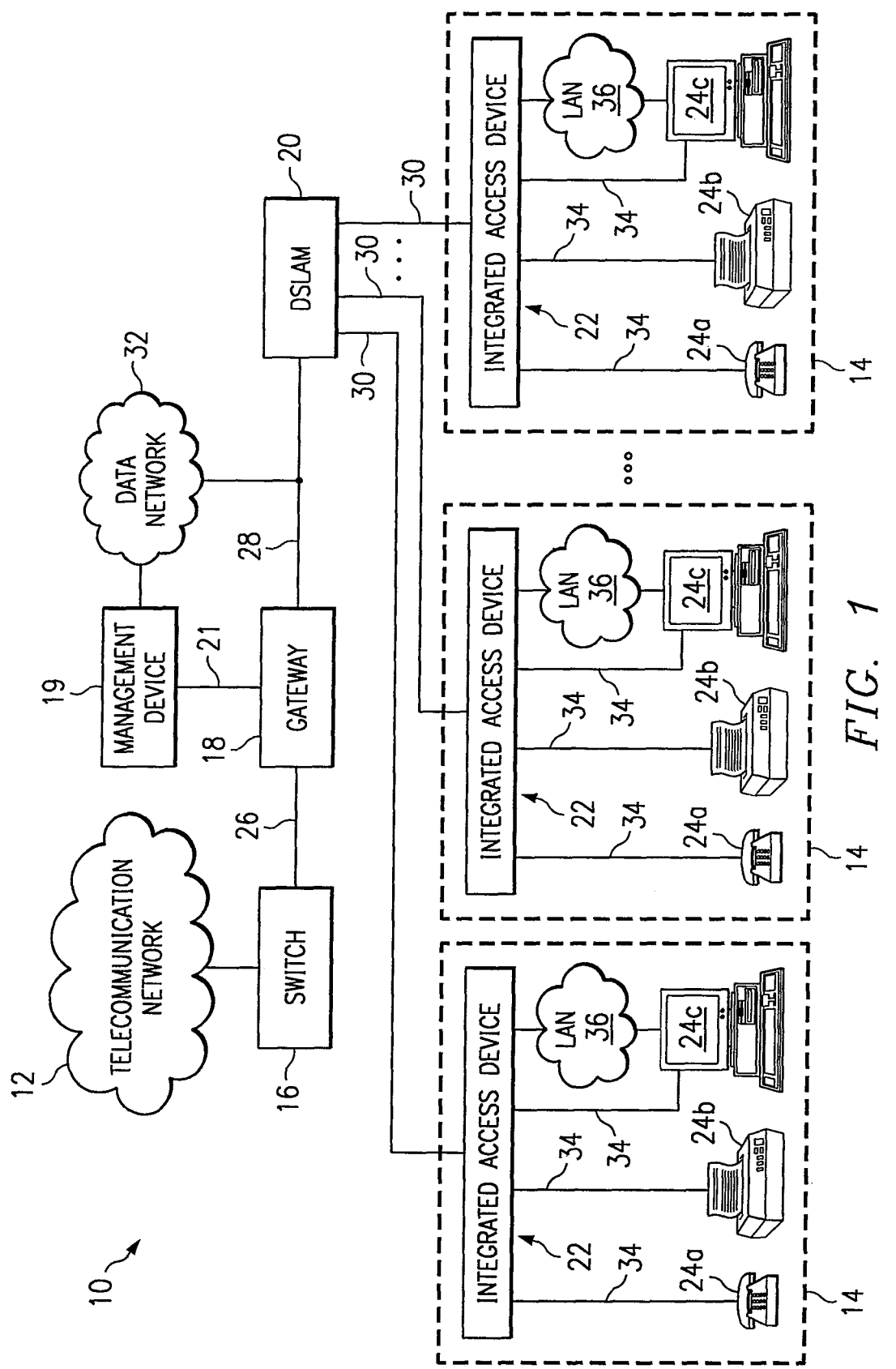
FIG. 1 illustrates a system that communicates telecommunication information between a telecommunication network and customer premises equipment using a DSL platform.

FIG. 1 illustrates a system 10 that communicates telecommunication information between a telecommunication network 12 and customer premises equipment 14 using a DSL platform. System 10 includes a switch 16, a gateway 18, a digital subscriber line access multiplexer (DSLAM) 20, integrated access devices (IADs) 22, and terminal devices 24a, 24b, and 24c (collectively, terminal devices 24). Using DSL technology, DSLAM 20 and IADs 22 deliver greater bandwidth over local loop circuits 30 than traditional plain old telephone service (POTS) and, thus, more efficiently communicate telecommunication information between telecommunication network 12 and customer premises equipment 14. To couple telecommunication network 12 to DSLAM 20, gateway 18 performs various compression and protocol conversions. Because gateway 18 supports several, alternative telecommunication, compression, and broadband technologies, it provides an integrated solution that is compatible with many different DSL platforms. As a result, telecommunication providers can deploy system 10 with greater flexibility and in a more cost-effective manner.

Telecommunication network 12 may be a public switched telephone network (PSTN), a private switched telephone network, or any other interconnected collection of telecommunication switches that provide local, regional, long distance, or international telephone service. Telecommunication information may include voice, data, image, video, or any other type of information that can be communicated using telecommunication network 12.

Telecommunication switch 16 communicates telecommunication information between telecommunication network 12 and gateway 18. Switch 16 may be a class 4 switch, a class 5 switch, or any other suitable device that communicates telecommunication information with telecommunication network 12.

Gateway 18 performs various compression and protocol conversions to communicate telecommunication information between switch 16 and DSLAM 20. To communicate telecommunication information with switch 16, gateway 18 uses GR-303, TR-8, signal system 7 (SS7), V5, integrated services digital network (ISDN) lines, unbundled analog lines, or any other suitable telecommunication interface 26. To communicate telecommunication information with DSLAM 20, gateway 18 generates data packets according to Internet Protocol (IP), Asynchronous Transfer Mode (ATM), Frame Relay, or any other suitable data communication protocol and communicates the data packets with DSLAM 20 using DS-1 lines, DS-3 lines, OC-3 lines, Ethernet lines, or any other suitable data link 28. In addition, to facilitate efficient communication of telecommunication information over the DSL platform, gateway 18 may compress and de-compress telecommunication information using various compression algorithms. Gateway 18 also may selectively perform echo cancellation on the telecommunication information to isolate and filter unwanted signal reflections.

Gateway 18 uses subscriber profiles to support these alternative telecommunication, compression, and broadband technologies. Gateway 18 receives subscriber information indicating a combination of telecommunication interfaces 26, data compression algorithms, data communication protocols, and data links 28 that gateway 18 should use in servicing either an individual subscriber or a group of subscribers. According to the received subscriber information, gateway 18 generates and stores a subscriber profile associating the individual subscriber or group of subscribers with the combination of telecommunication interfaces 26, data compression algorithms, data communication protocols, and data links 28. Gateway 18 may receive the subscriber information from switch 16, IADs 22, or a management device 19. Management device 19 may be a network management system (NMS), a softswitch, or any other suitable device for managing the operation of gateway 18 and may communicate subscriber information to gateway 18 using either a wireline, wireless, or other suitable type of data link 21 or data network 32. In a particular embodiment, gateway 18 receives subscriber information relating to one of IADs 22, and in response, gateway 18 generates and stores a subscriber profile associating the subscribers serviced by IAD 22 with a combination of telecommunication interfaces 26, data compression algorithms, data communication protocols, and data links 28 that gateway 18 should use in servicing those subscribers.

To communicate telecommunication information between switch 16 and DSLAM 20, gateway 18 identifies a subscriber associated with the telecommunication information and communicates the telecommunication information according to the subscriber's stored profile. To communicate telecommunication information from switch 16 to DSLAM 20, gateway 18 receives telecommunication information from switch 16 using interface 26 associated with the subscriber, compresses the telecommunication information using the data compression algorithm associated with the subscriber, generates data packets encapsulating the telecommunication information according to the data communication protocol associated with the subscriber, and communicates the data packets to DSLAM 20 using data link 28 associated with the subscriber. To communicate telecommunication information from DSLAM 20 to switch 16, gateway 18 receives data packets from data link 28 associated with the subscriber, extracts telecommunication information from the data packets according to the data communication protocol associated with the subscriber, de-compresses the telecommunication information according to the data compression algorithm associated with the subscriber, and communicates the telecommunication information to switch 16 using interface 26 associated with the subscriber. By supporting several, alternative telecommunication interfaces 26, data compression algorithms, data communication protocols, and data links 28, gateway 18 provides an integrated communication solution that is compatible with many different DSL platforms.

Although not illustrated in FIG. 1, data switches, routers, or other data communication equipment may be coupled between gateway 18 and DSLAM 20. Using IP, ATM, Frame Relay, or any other suitable data communication protocol, the data communication equipment may communicate data packets between gateway 18 and DSLAM 20.

DSLAM 20 communicates data packets between gateway 18 and IADs 22 using DSL technology. DSLAM 20 receives data packets from gateway 18, processes the data packets to generate digital DSL data, and communicates the digital DSL data to IADs 22 using local loop circuits 30. DSLAM 20 also receives digital DSL data from IADs 22 using local loop circuits 30, identifies data packets for delivery to gateway 18, and communicates the data packets to gateway 18. Asymmetric DSL (ADSL), integrated DSL (IDSL), symmetric DSL (SDSL), high data rate DSL (HDSL), rate-adaptive DSL (RADSL), very-high data rate DSL (VDSL), DSL-LITE, or other forms of DSL technology allow data transmissions over local loop circuits 30 at greater speeds than offered by traditional dial-up modems. As a result, by using DSL technology, system 10 may support broadband, telecommunication services over local loop circuits 30.

In a particular embodiment, DSLAM 20 also communicates data packets between data network 32 and IADs 22. Data network 32 may include a wide-area network (WAN), a local-area network (LAN), the Internet, or any other interconnected collection of switches, routers, or other data communication equipment that provides data services. DSLAM 20 receives data packets from data network 32, processes the data packets to generate digital DSL data, and communicates the digital DSL data to IADs 22 using local loop circuits 30. DSLAM 20 also receives digital DSL data from local loop circuits 30, identifies data packets for delivery to data network 32, and communicates the data packets to data network 32.

IADs 22 communicate telecommunication information between DSLAM 20 and terminal devices 24. IADs 22 receive digital DSL data from local loop circuits 30, identify data packets including telecommunication information for terminal devices 24, process the data packets to generate analog telephone signals, and communicate the analog telephone signals to terminal devices 24 using subscriber lines 34. IADs 22 also receive, from subscriber lines 34, analog telephone signals communicating telecommunication information from terminal devices 24. IADs 22 process the analog telephone signals to generate data packets including the telecommunication information, process the data packets to generate digital DSL data, and communicate the digital DSL data to DSLAM 20 using local loop circuits 30. Each subscriber line 34 may support one or more terminal devices 24 and may couple to terminal devices 24 using wireline, wireless, or any other suitable communication path. Terminal devices 24 may include telephones 24a, facsimile machines 24b, computers 24c, or any other suitable device that communicates telecommunication information using telecommunication network 12.

In a particular embodiment, IADs 22 also communicate data packets with LANs 36. IADs 22 receive digital DSL data from local loop circuits 30, identify data packets for delivery to LANs 36, and communicate the data packets to LANs 36. IADs 22 also receive data packets from LANs 36, process the data packets to generate digital DSL data, and communicate the digital DSL data to DSLAM 20 using local loop circuits 30.

Although FIG. 1 illustrates switch 16, gateway 18, and DSLAM 20 as separate devices, the present invention contemplates that system 10 may include any combination of one or more devices at one or more locations that communicate telecommunication information between telecommunication network 12 and customer premises equipment 14 using a DSL platform. For example, in an alternative embodiment, a single device may perform the operations associated with gateway 18 and DSLAM 20.

Figure 2:
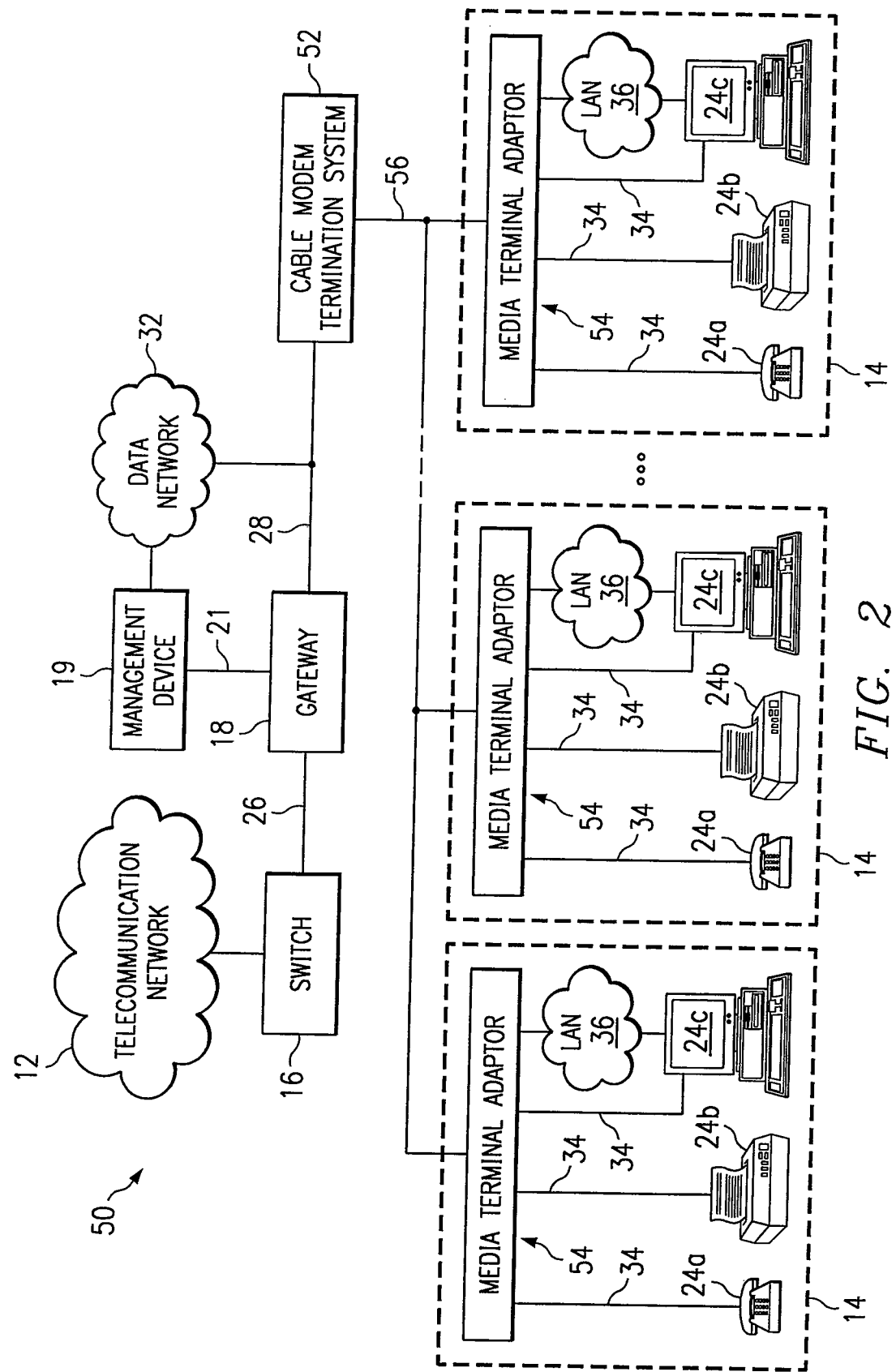
FIG. 2 illustrates a system that communicates telecommunication information between a telecommunication network and customer premises equipment using a cable platform.

FIG. 2 illustrates a system 50 that communicates telecommunication information between telecommunication network 12 and customer premises equipment 14 using a cable platform. System 50 includes switch 16, gateway 18, a cable modem termination system (CMTS) 52, media terminal adapters (MTAs) 54, and terminal devices 24. System 50 operates in a similar manner as system 10, except instead of using DSLAM 20 and IADs 22 to communicate digital DSL data over local loop circuits 30, system 50 uses CMTS 52 and MTAs 54 to communicate data packets over cable links 56. CMTS 52 and MTAs 54 deliver greater bandwidth over cable link 56 than traditional plain old telephone service (POTS) offers over local link circuits 30. Thus, CMTS 52 and MTAs 54 provide a more efficient means of communicating telecommunication information between telecommunication network 12 and customer premises equipment 14. To couple telecommunication network 12 to CMTS 52, gateway 18 performs various compression and protocol conversions. Because gateway 18 supports several, alternative telecommunication, compression, and broadband technologies, gateway 18 is compatible with many different cable platforms. As a result, telecommunication providers can deploy system 50 with greater flexibility and in a more cost-effective manner.

Gateway 18 performs various compression and protocol conversions to communicate telecommunication information between switch 16 and CMTS 52. To communicate telecommunication information with switch 16, gateway 18 uses GR-303, TR-8, SS7, V5, ISDN lines, unbundled analog lines, or any other suitable telecommunication interface 26. To communicate telecommunication information with CMTS 52, gateway 18 generates data packets according to IP, ATM, Frame Relay, or any other suitable data communication protocol and communicates the data packets with CMTS 52 using DS-1 lines, DS-3 lines, OC-3 lines, Ethernet lines, or other suitable data link 28. In addition, to facilitate efficient communication of telecommunication information over the cable platform, gateway 18 may compress and de-compress telecommunication information using various compression algorithms. Gateway 18 also may selectively perform echo cancellation on the telecommunication information to isolate and filter unwanted signal reflections.

Gateway 18 uses subscriber profiles to support these alternative telecommunication, compression, and broadband technologies. Gateway 18 receives subscriber information indicating a combination of telecommunication interfaces 26, data compression algorithms, data communication protocols, and data links 28 that gateway 18 should use in servicing either an individual subscriber or a group of subscribers. According to the received subscriber information, gateway 18 generates and stores a subscriber profile associating the individual subscriber or group of subscribers with the combination of telecommunication interfaces 26, data compression algorithms, data communication protocols, and data links 28. Gateway 18 may receive the subscriber information from switch 16, MTAs 54, or a management device 19. Management device 19 may be a network management system (NMS), a softswitch, or any other suitable device for managing the operation of gateway 18 and may communicate subscriber information to gateway 18 using either a wireline, wireless, or other suitable type of data link 21 or data network 32. In a particular embodiment, gateway 18 receives subscriber information relating to one of MTAs 54, and in response, gateway 18 generates and stores a subscriber profile associating the subscribers serviced by MTA 54 with a combination of telecommunication interfaces 26, data compression algorithms, data communication protocols, and data links 28 that gateway 18 should use in servicing those subscribers.

To communicate telecommunication information between switch 16 and CMTS 52, gateway 18 identifies a subscriber associated with the telecommunication information and communicates the telecommunication information according to the subscriber's stored profile. To communicate telecommunication information from switch 16 to CMTS 52, gateway 18 receives telecommunication information from switch 16 using interface 26 associated with the subscriber, compresses the telecommunication information using the data compression algorithm associated with the subscriber, generates data packets encapsulating the telecommunication information according to the data communication protocol associated with the subscriber, and communicates the data packets to CMTS 52 using data link 28 associated with the subscriber. To communicate telecommunication information from CMTS 52 to switch 16, gateway 18 receives data packets from data link 28 associated with the subscriber, extracts telecommunication information from the data packets according to the data communication protocol associated with the subscriber, de-compresses the telecommunication information according to the data compression algorithm associated with the subscriber, and communicates the telecommunication information to switch 16 using interface 26 associated with the subscriber. By supporting several, alternative telecommunication interfaces 26, data compression algorithms, data communication protocols, and data links 28, gateway 18 provides an integrated communication solution that is compatible with many different cable platform.

Although not illustrated in FIG. 2, data switches, routers, or other data communication equipment may be coupled between gateway 18 and CMTS 52. Using IP, ATM, Frame Relay, or any other suitable data communication protocol, the data communication equipment may communicate data packets between gateway 18 and CMTS 52.

CMTS 52 communicates data packets between gateway 18 and MTAs 54. CMTS 52 receives data packets from gateway 18, processes the data packets for communication over cable link 56, and communicates the data packets to MTAs 54 using cable link 56. CMTS 52 also receives data packets from MTAs 54 using cable link 56, identifies data packets for delivery to gateway 18, and communicates the data packets to gateway 18. CMTS 52 and MTAs 54 communicate data over cable link 56 at greater speeds than offered by traditional dial-up modems. As a result, system 50 may support broadband, telecommunication services over cable link 56.

In a particular embodiment, CMTS 52 also communicates data packets between data network 32 and MTAs 54. CMTS 52 receives data packets from data network 32, processes the data packets for communication over cable link 56, and communicates the data packets to MTAs 54 using cable link 56. CMTS 52 also receives data packets from cable link 56, identifies data packets for delivery to data network 32, and communicates the data packets to data network 32.

MTAs 54 communicate telecommunication information between CMTS 52 and terminal devices 24. MTAs 54 receive data packets from cable link 56, identify data packets including telecommunication information for terminal devices 24, process the data packets to generate analog telephone signals, and communicate the analog telephone signals to terminal devices 24 using subscriber lines 34. MTAs 54 also receive, from subscriber lines 34, analog telephone signals communicating telecommunication information from terminal devices 24. MTAs 54 process the analog telephone signals to generate data packets including the telecommunication information, processes the data packets for communication over cable link 56, and communicate the data packets to CMTS 52 using cable link 56. Each subscriber line 34 may support one or more terminal devices 24 and may couple to terminal devices 24 using wireline, wireless, or any other suitable communication path.

In a particular embodiment, MTAs 54 also communicate data packets with LANs 36. MTAs 54 receive data packets from cable link 56 for delivery to LANs 36 and communicate the data packets to LANs 36. MTAs 54 also receive data packets from LANs 36 for delivery to CMTS 52 and communicate the data packets to CMTS 52 using data link 56.

Although FIG. 2 illustrates switch 16, gateway 18, and CMTS 52 as separate devices, the present invention contemplates that system 50 may include any combination of one or more devices at one or more locations that communicate telecommunication information between telecommunication network 12 and customer premises equipment 14 using a cable platform. For example, in an alternative embodiment, a single device may perform the operations associated with gateway 18 and CMTS 52.

Figure 3:
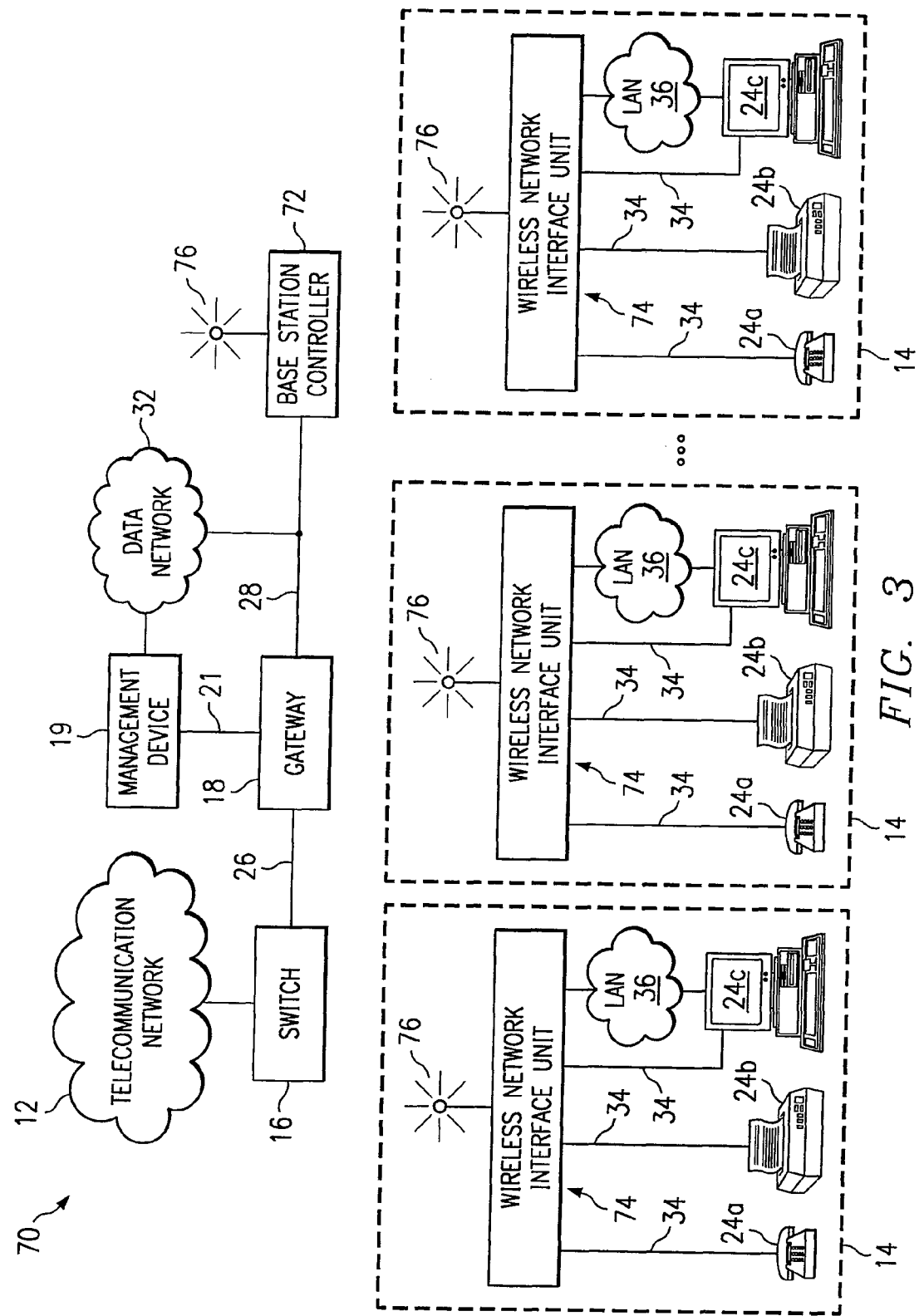
FIG. 3 illustrates a system that communicates telecommunication information between a telecommunication network and customer premises equipment using a wireless platform.

FIG. 3 illustrates a system 70 that communicates telecommunication information between telecommunication network 12 and customer premises equipment 14 using a wireless platform. System 70 includes switch 16, gateway 18, a base station controller (BSC) 72, wireless network interface units (WNIUs) 74, and terminal devices 24. In contrast to system 10 (which communicates telecommunication information over local loop circuits 30 using DSLAM 20 and IADs 22) and system 50 (which communicates telecommunication information over cable link 56 using CMTS 52 and MTAs 54), system 70 uses BSC 72 and WNIUs 74 to communicate telecommunication information over wireless links 76. BSC 72 and WNIUs 74 deliver greater bandwidth over wireless links 76 than traditional plain old telephone service (POTS)

offers over local link circuits 30. Thus, BSC 72 and WNIUs 74 provide a more efficient means of communicating telecommunication information between telecommunication network 12 and customer premises equipment 14. To couple telecommunication network 12 to BSC 72, gateway 18 performs various compression and protocol conversions. Because gateway 18 supports several, alternative telecommunication, compression, and broadband technologies, gateway 18 is compatible with many different wireless platforms. As a result, telecommunication providers can deploy system 70 with greater flexibility and in a more cost-effective manner.

Gateway 18 performs various compression and protocol conversions to communicate telecommunication information between switch 16 and BSC 72. To communicate telecommunication information with switch 16, gateway 18 uses GR-303, TR-8, SS7, V5, ISDN lines, unbundled analog lines, or any other suitable telecommunication interface 26. To communicate telecommunication information with BSC 72, gateway 18 generates data packets according to IP, ATM, Frame Relay, or any other suitable data communication protocol and communicates the data packets with BSC 72 using DS-1 lines, DS-3 lines, OC-3 lines, Ethernet lines, or other suitable data link 28. In addition, to facilitate efficient communication of telecommunication information over the wireless platform, gateway 18 may compress and de-compress telecommunication information using various compression algorithms. Gateway 18 also may selectively perform echo cancellation on the telecommunication information to isolate and filter unwanted signal reflections.

Gateway 18 uses subscriber profiles to support these alternative telecommunication, compression, and broadband technologies. Gateway 18 receives subscriber information indicating a combination of telecommunication interfaces 26, data compression algorithms, data communication protocols, and data links 28 that gateway 18 should use in servicing either an individual subscriber or a group of subscribers. According to the received subscriber information, gateway 18 generates and stores a subscriber profile associating the individual subscriber or group of subscribers with the combination of telecommunication interfaces 26, data compression algorithms, data communication protocols, and data links 28. Gateway 18 may receive the subscriber information from switch 16, WNIUs 74, or a management device 19. Management device 19 may be a network management system (NMS), a softswitch, or any other suitable device for managing the operation of gateway 18 and may communicate the subscriber information to gateway 18 using either a wireline, wireless, or other suitable type of data link 21 or data network 32. In a particular embodiment, gateway 18 receives subscriber information relating to one of WNIUs 74, and in response, gateway 18 generates and stores a subscriber profile associating the subscribers serviced by WNIU 74 with a combination of telecommunication interfaces 26, data compression algorithms, data communication protocols, and data links 28 that gateway 18 should use in servicing those subscribers.

To communicate telecommunication information between switch 16 and BSC 72, gateway 18 identifies a subscriber associated with the telecommunication information and communicates the telecommunication information according to the subscriber's stored profile. To communicate telecommunication information from switch 16 to BSC 72, gateway 18 receives telecommunication information from switch 16 using interface 26 associated with the subscriber, compresses the telecommunication information using the data compression algorithm associated with the subscriber, generates data packets encapsulating the telecommunication information according to the data communication protocol associated with the subscriber, and communicates the data packets to BSC 72 using data link 28 associated with the subscriber. To communicate telecommunication information from BSC 72 to switch 16, gateway 18 receives data packets from data link 28 associated with the subscriber, extracts telecommunication information from the data packets according to the data communication protocol associated with the subscriber, decompresses the telecommunication information according to the data compression algorithm associated with the subscriber, and communicates the telecommunication information to switch 16 using interface 26 associated with the subscriber. By supporting several, alternative telecommunication interfaces 26, data compression algorithms, data communication protocols, and data links 28, gateway 18 provides an integrated communication solution that is compatible with many different wireless platform.

Although not illustrated in FIG. 3, data switches, routers, or other data communication equipment may be coupled between gateway 18 and BSC 72. Using IP, ATM, Frame Relay, or any other suitable data communication protocol, the data communication equipment may communicate data packets between gateway 18 and BSC 72.

BSC 72 communicates data packets between gateway 18 and WNIUs 74. BSC 72 receives data packets from gateway 18, processes the data packets for wireless communication, and communicates the data packets to WNIUs 74 using wireless links 76. BSC 72 also receives data packets from WNIU 74 using wireless links 76, identifies data packets for delivery to gateway 18, and communicates the data packets to gateway 18. BSC 72 and WNIUs 74 communicate data packets over wireless links 76 at greater speeds than offered by traditional dial-up modems. As a result, system 70 may support broadband, telecommunication services over wireless links 76.

In a particular embodiment, BSC 72 also communicates data packets between data network 32 and WNIUs 74. BSC 72 receives data packets from data network 32, processes the data packets for wireless communication, and communicates the data packets to WNIUs 74 using wireless links 76. BSC 72 also receives data packets from WNIUs 74 using wireless links 76, identifies data packets for delivery to data network 32, and communicates the data packets to data network 32.

WNIUs 74 communicate telecommunication information between BSC 72 and terminal devices 24. WNIUs 74 receive data packets from wireless links 76, identify data packets including telecommunication information for terminal devices 24, process the data packets to generate analog telephone signals, and communicate the analog telephone signals to terminal devices 24 using subscriber lines 34. WNIUs 74 also receive, from subscriber lines 34, analog telephone signals communicating telecommunication information from terminal devices 24. WNIUs 74 process the analog telephone signals to generate data packets including the telecommunication information, process the data packets for wireless communication, and communicate the data packets to BSC 72 using wireless links 76. Each subscriber line may support one or more terminal devices 24 and may couple to terminal devices 24 using wireline, wireless, or any other suitable communication path.

In a particular embodiment, WNIUs 74 also communicate data packets with LANs 36. WNIUs 74 receive data packets from wireless links 76, identify data packets for delivery to LANs 36, and communicate the data packets to LANs 36. WNIUs 74 also receive data packets from LANs 36, process the data packets for wireless communication, and communicate the data packets to BSC 72 using wireless link 76.

Although FIG. 3 illustrates switch 16, gateway 18, and BSC 72 as separate devices, the present invention contemplates that system 70 may include any combination of one or more devices at one or more locations that communicate telecommunication information between telecommunication network 12 and customer premises equipment 14 using a wireless platform. For example, in an alternative embodiment, a single device may perform the operations associated with gateway 18 and BSC 72.

Although FIGS. 1-3 illustrate DSL, cable, and wireless platforms, the present invention contemplates that gateway 18 may also couple telecommunication network 12 to any other suitable broadband platform.

Figure 4:
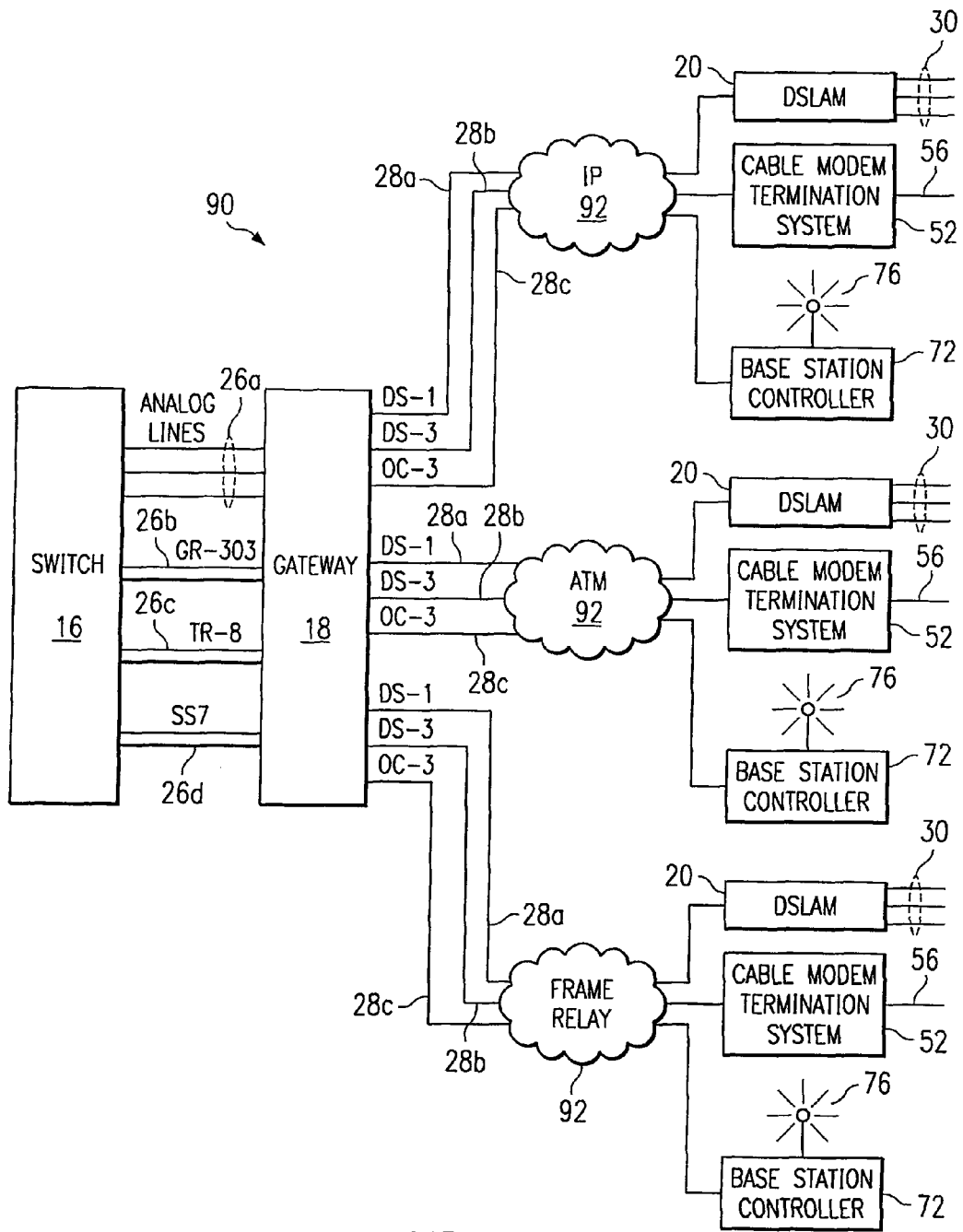
FIG. 4 illustrates a system that uses several, alternative telecommunication interfaces, data compression algorithms, data communication protocols, and data links to couple a telecommunication switch to DSL, cable, and wireless platforms.

FIG. 4 illustrates system 90 that uses several, alternative telecommunication interfaces 26, data compression algorithms, data communication protocols, and data links 28 to couple a telecommunication switch 16 to DSL, cable, and wireless platforms. System 90 includes switch 16, gateway 18, DSLAMs 20, CMTSs 52, and BSCs 72. To communicate telecommunication information over the DSL, cable, and wireless platforms, gateway 18 performs various compression and protocol conversions to couple switch 16 to DSLAMs 20, CMTSs 52, and BSCs 72. Gateway 18 supports several, alternative telecommunication, compression, and broadband technologies so that it is compatible with many different switches 16, access networks 92, DSLAMs 20, CMTSs 52, and BSCs 72.

Gateway 18 communicates telecommunication information with switch 16 using several, alternative telecommunication interfaces 26. Unbundled analog lines 26a communicate telecommunication information using analog signals. Each analog line 26a communicates a separate call. In contrast, GR-303 interface 26b, TR-8 interface 26c, and SS7 interface 26a are concentrated, digital interfaces that can communicate more than one call over a single line. Although FIG. 4 illustrates analog lines 26a, GR-303 interface 26b, TR-8 interface 26c, and SS7 interface 26d, gateway 18 may communicate telecommunication information with switch 16 using any suitable telecommunication interface 26. For example, in an alternative embodiment, gateway 18 may communicate telecommunication information with switch 16 using V5 or ISDN lines.

Gateway 18 compresses and de-compresses telecommunication information using several, alternative compression algorithms. To facilitate efficient communication of data packets over DSL, cable, and wireless platforms, gateway 18 may compress and de-compress telecommunication information using G.711, G.723, G.728, G.729, or any other suitable compression algorithm. Gateway 18 receives telecommunication information from switch 16, compresses the telecommunication information using several, alternative compression algorithms, and communicates the compressed telecommunication information to DSLAMs 20, CMTSs 52, and BSCs 72. Gateway 18 also receives compressed telecommunication information from DSLAMs 20, CMTSs 52, and BSCs 72, de-compresses the telecommunication information using several, alternative compression algorithms, and communicates the de-compressed telecommunication information to switch 16.

Gateway 18 communicates telecommunication information with DSLAMs 20, CMTSs 52, and BSCs 72 using several, alternative data communication protocols. Gateway 18 receives telecommunication information from switch 16, generates data packets encapsulating the telecommunication information according to several, alternative data communication protocols, and communicates the data packets to DSLAMs 20, CMTSs 52, and BSCs 72. Gateway 18 also receives data packets from DSLAMs 20, CMTSs 52, and BSCs 72. Gateway 18 extracts telecommunication information from the data packets according to several, alternative data communication protocols, and communicates the telecommunication information to switch 16.

By supporting several, alternative data communication protocols, gateway 18 may communicate telecommunication information with DSLAM 20, CMTSs 52, and BSCs 72 using an IP network 92a, an ATM network 92b, or a Frame Relay network 92c (collectively, access networks 92). Access networks 92 may include any suitable combination of data switches, routers, or other data communication equipment that communicates data packets using a data communication protocol. Although FIG. 4 illustrates IP, ATM, and frame relay networks 92, gateway 18 may use any suitable data communication protocol and corresponding network 92 to communicate data packets with DSLAMs 20, CMTSs 52, and BSCs 72.

In a particular embodiment, gateway 18 sets priority bits in a subscriber's data packets according to the subscriber's assigned quality of service. If a subscriber is assigned a high quality of service, gateway 18 sets the priority bits in the subscriber's data packets so that the packets receive a high priority in communication to customer premises equipment 14. If a subscriber is assigned a low quality of service, gateway 18 sets the priority bits in the subscriber's data packets so that the packet receives a low priority in communication to customer premises equipment 14.

Gateway 18 communicates data packets using several, alternative data links 28. Although FIG. 4 illustrates DS-1 lines 28a, DS-3 lines 28b, and OC-3 lines 28c, gateway 18 may communicate data packets using any other suitable data link 28. For example, in an alternative embodiment, gateway 18 communicates data packets using 10 Mbps, 100 Mbps, 1000 Mbps, or any other suitable version of Ethernet over coaxial, twisted-pair, fiber, or other suitable type of cable. As described above, data links 28 may couple gateway 18 directly to DSLAMs 20, CMTSs 52, and BSCs 72, or data links 28 may couple gateway 18 to data switches, routers, or any other suitable data communication equipment that communicates data packets with DSLAMs 20, CMTSs 52, and BSCs 72.

Gateway 18 uses subscriber profiles to properly employ the alternative telecommunication, compression, and broadband technologies. A subscriber profile may associate an individual subscriber or a group of subscribers with a combination of telecommunication interfaces 26, data compression algorithms, data communication protocols, and data links 28. For example, in a particular embodiment, a profile may associate the subscribers serviced by each IAD 22, MTA 54, or WNIU 74 as a group with a telecommunication interface 26, a data compression algorithm, a data communication protocol, and a data link 28. The subscriber profiles may also indicate each subscriber's assigned quality of service and whether gateway 18 should perform echo cancellation on each subscriber's telecommunication information.

When gateway 18 receives telecommunication information from switch 16, gateway 18 identifies a subscriber associated with the telecommunication information and communicates the telecommunication information to DSLAM 20, CMTS 52, or BSC 72 according to the subscriber's stored profile. If the profile indicates that gateway 18 should perform echo cancellation on the telecommunication information, gateway 18 performs echo cancellation on the telecommunication information. Gateway 18 also compresses the telecommunication information using a compression algorithm indicated in the subscriber profile, generates data packets encapsulating the telecommunication information according to a data communication protocol indicated in the subscriber profile, and communicates the data packets to data link 28 indicated in the subscriber profile. In a particular embodiment, gateway 18 sets priority bits in the subscriber's data packets according to the quality of service indicated in the subscriber's stored profile.

In a particular embodiment, each subscriber is associated with one of interfaces 26, and gateway 18 identifies a subscriber associated with telecommunication information according to interface 26 from which gateway 18 receives the telecommunication information. For example, each subscriber may be associated with one of unbundled analog lines 26a. When gateway 18 receives telecommunication information from one of analog lines 26a, gateway 18 identifies a subscriber associated with analog line 26a and communicates the telecommunication information according to the subscriber's profile. Similarly, each subscriber may be associated with a time slot in GR-303 interface 26b, TR-8 interface 26c, or SS7 interface 26d. When gateway 18 receives telecommunication information from a time slot in GR-303 interface 26b, TR-8, interface 26c, or SS7 interface 26d, gateway 18 identifies a subscriber associated with the time slot and communicates the telecommunication information according to the subscriber's profile.

In an alternative embodiment, gateway 18 receives a subscriber identifier with telecommunication information from switch 16, identifies a subscriber associated with the telecommunication information using the subscriber identifier, and then communicates the telecommunication information according to the subscriber's stored profile. The subscriber identifier may be a name, address, telephone number, or any other suitable subscriber information associated with subscribers serviced by gateway 18.

When gateway 18 receives a data packet from DSLAM 20, CMTS 52, or BSC 72, gateway 18 extracts telecommunication information from the data packet, identifies a subscriber associated with the telecommunication information, and communicates the telecommunication information to switch 16 according to the subscriber's profile. Gateway 18 decompresses the telecommunication information using a compression algorithm indicated in the subscriber profile, selectively performs echo cancellation on the telecommunication information as indicated in the subscriber profile, and communicates the telecommunication information to switch 16 using interface 26 indicated in the subscriber profile. In a particular embodiment, gateway 18 associates subscriber profiles with data network addresses, and gateway 18 identifies a subscriber associated with telecommunication information according to a source or destination address of the data packet. In an alternative embodiment, the data packet includes a name, address, telephone number, or other subscriber identifier that gateway 18 uses to identify a subscriber associated with the telecommunication information.

Because gateway 18 supports several, alternative telecommunication, compression, and broadband technologies, it provides an integrated solution that is compatible with many different DSL, cable, wireless or other broadband platforms. As a result telecommunication providers can deploy system 90 with greater flexibility and in a more cost effective manner.

FIG. 5 illustrates a gateway 18 that uses several, alternative telecommunication interfaces 26, data compression algorithms, data communication protocols, and data links 28 to communicate telecommunication information. Gateway 18 includes management module 100, memory 102, telecommunication interface modules (TIMs) 104, echo cancellation modules 106, compression modules 108, packetization modules 110, and network interface modules 112. Management module 100, TIMs 104, echo cancellation modules 106, compression modules 108, packetization modules 110, and network interface modules 112 represent functional elements that are reasonably self-contained so that each can be designed, constructed, and updated substantially independent of the others. In a particular embodiment, management module 100, TIMs 104, echo cancellation modules 106, compression modules 108, packetization modules 110, and network interface modules 112 are implemented on separate printed circuit boards that may be coupled to a backplane in gateway 18.

In the illustrated embodiment, a time division multiplexing (TDM) bus 114, a data packet bus 118, and a control bus 120 communicate telecommunication information, data packets, and control information within gateway 18. TDM bus 114 communicates several streams of telecommunication information among TIMs 104, echo cancellation modules 106, compression modules 108, and packetization modules 110. A clock signal 116 divides TDM bus 114 into a fixed sequence of time slots, and each stream of telecommunication information is assigned a different time slot in the sequence. In a particular embodiment, management module 100 assigns 64 kilobits per second (kb/s) time slots to each subscriber serviced by gateway 18 and stores subscriber profiles associating the assigned time slots with the subscribers in memory 102. Management module 100 may provision TDM bus 114 at start-up of gateway 18 to support fixed time slot assignments or during operation of gateway 18 to support dynamic time slot assignments. Data packet bus 118 communicates data packets between packetization modules 110 and network interface modules 112, and control bus 120 communicates control information between management module 100 and TIMs 104, echo cancellation modules 106, compression modules 108, packetization modules 110, and network interface modules 112.

Although the particular embodiment of gateway 18 described with reference to FIG. 5 includes three different busses 114, 118, and 120, gateway 18 may use any combination of dedicated or shared communication paths to communicate telecommunication information, data packets, and control information among modules 100, 104, 106, 108, 110, and 112. For example, in an alternative embodiment, an IEEE 802.6 bus communicates telecommunication information between TIMs 104, echo cancellation modules 106, compression modules 108, and packetization modules 110 and also communicates data packets between packetization modules 110 and network interface modules 112. In another alternative embodiment, gateway 18 may perform a combination of echo cancellation, compression, and packetization without requiring any bus transfer between different modules.

Using subscriber profiles stored in memory 102, management module 100 manages the operation of gateway 18 to ensure that each subscriber's telecommunication information is handled using the proper telecommunication, compression, and broadband technologies. Management module 100 receives subscriber information indicating a combination of telecommunication interfaces 26, data compression algorithms, data communication protocols, and data links 28 that gateway 18 should use in servicing either an individual subscriber or a group of subscribers. The subscriber information may also indicate a subscriber's assigned quality of service and whether gateway 18 should perform echo cancellation on the subscriber's telecommunication information. Gateway 18 generates and stores subscriber profiles in memory 102 according to the received subscriber information. Management module may receive the subscriber information from management device 19, switch 16, IADs 22, MTAs 54, or WNIUs 74. To control the operation of gateway 18, management module 100 communicates control information to TIMs 104, echo cancellation modules 106, compression modules 108, packetization modules 110, and network interface modules 112. Although memory 102 appears internal to gateway 18 in FIG. 5, memory 102 may be internal to or external from gateway 18 according to particular needs.

TIMs 104 communicate telecommunication information with switch 16 using several, alternative interfaces 26. Each TIM 104 may communicate telecommunication information using either a single type of interface 26 or several, different types of interfaces 26. During configuration, TIMs 104 receive control information identifying subscribers' interfaces 26 and assigned time slots in TDM bus 114. Once configured, TIMs 104 receive telecommunication information from subscribers associated interfaces 26, process the telecommunication information for communication using TDM bus 114, and communicate the telecommunication information to the subscribers' assigned time slots in TDM bus 114. TIMs 104 also receive telecommunication information from subscribers' time slots in TDM bus 114, process the telecommunication information according to the subscribers' corresponding interfaces 26, and communicate the telecommunication information to switch 16 using the subscribers' corresponding interfaces 26.

In a particular embodiment, one of TIMs 104 communicates analog telephone signals with switch 16 using unbundled analog lines 26a. In such an embodiment, TIM 104 receives analog telephone signals communicating telecommunication information from switch 16, processes the analog telephone signals to generate digital telecommunication information, and communicates the digital telecommunication information to TDM bus 114. TIM 104 also receives digital telecommunication information from TDM bus 114, generates analog telephone signals for communicating the telecommunication information, and communicates the analog telephone signals to switch 16 using unbundled analog lines 26a. In an alternative embodiment, TIMs 104 communicates digital telecommunication information with switch 16 using GR-303, TR-8, SS7, V5, ISDN lines, or other suitable digital interfaces 26.

Echo cancellation modules 106 selectively perform echo cancellation on telecommunication information to isolate and filter unwanted signal reflections. During configuration, echo cancellation modules 106 receive, from management module 100, control information identifying telecommunication information on which echo cancellation modules 106 should perform echo cancellation. In a particular embodiment, the control information identifies subscribers' assigned time slots in TDM bus 114. Once configured, echo cancellation modules 106 receive telecommunication information from TDM bus 114, perform echo cancellation on the telecommunication information, and communicate the telecommunication information back to TDM bus 114. Echo cancellation modules 106 also may selectively perform varying lengths of echo cancellation, based on the control information received from management module 100.

Compression modules 108 compress and de-compress telecommunication information using several, alternative compression algorithms. During configuration, compression modules 108 receive, from management module 100, control information identifying telecommunication information that compression modules 108 should compress or de-compress. In a particular embodiment, the control information identifies subscribers' assigned time slots in TDM bus 114. Once configured, compression modules 108 receive telecommunication information from TIMs 104 or echo cancellation modules 106 using TDM bus 114, compress the telecommunication information using the subscribers' associated compression algorithms, and communicate the compressed telecommunication information to packetization modules 110 using TDM bus 114. Compression modules 108 also receive compressed telecommunication information from packetization modules 110 using TDM bus 114, de-compress the telecommunication information using the subscribers' associated compression algorithms, and communicate the de-compressed telecommunication information to TIMs 104 or echo cancellation modules 106 using TDM bus 114.

Compression modules 108 may compress and de-compress telecommunication information using G.711, G.722, G.723, G.728, G.729, or any other suitable compression algorithm. In a particular embodiment, each compression module 108 supports a separate compression algorithm. In an alternative embodiment, each compression module 108 supports several, different compression algorithms, and each compression module 108 compresses or de-compresses a subscriber's telecommunication information using a compression algorithm selected according to control information received from management module 100.

Packetization modules 110 process subscribers' telecommunication information according to several, alternative data communication protocols. During configuration, packetization modules 110 receive, from management module 100, control information identifying subscribers' assigned time slots in TDM bus 114, data addresses, or other suitable identifiers. Once configured, packetization modules 110 receive telecommunication information from TDM bus 114 using subscribers' assigned time slot. Packetization modules 110 may receive either compressed telecommunication information from compression modules 108 or uncompressed telecommunication information from TIMs 104 or echo cancellation modules 106. Packetization modules 110 encapsulate the telecommunication information in data packets according to the subscribers' associated data communication protocols, assign the data packets the subscribers' destination addresses, and communicate the data packets to network interface modules 112. In a particular embodiment, packetization modules 110 set priority bits in the subscribers' data packets according to the subscribers' assigned quality of service. Packetization modules 110 also receive data packets from network interface modules 112. Packetization modules 110 extract telecommunication information from the data packets, identify subscribers associated with the telecommunication information, and communicate the telecommunication information to TDM bus 114 using the subscribers' assigned time slot in TDM bus 114. As described above, packetization modules 110 may identify the subscribers based on the source or destination addresses of the data packets or subscriber identifiers included in the data packets.

Packetization modules 110 may employ IP, ATM, frame relay, or any other suitable data communication protocol to generate and process data packets. In a particular embodiment, each packetization module 110 supports a separate data communication protocol. In an alternative embodiment, each packetization module 110 supports several, alternative data communication protocols, and each packetization module 110 communicates a subscriber's telecommunication information using a protocol selected according to control information received from management module 100.

Network interface modules 112 communicate data packets between packetization modules 110 and data links 28. Network interface modules 112 may be coupled to DS-1 lines, DS-3 lines, OC-3 lines, Ethernet lines, or any other suitable data links 28. Network interface modules 112 receive subscriber's data packets from packetization modules 110 and communicate the data packets to subscriber's associated data links 28. Network interface modules 112 also receive data packets from data links 28 and communicate the data packets to packetization modules 110. In a particular embodiment, each network interface module 112 supports a single data link 28. In an alternative embodiment, each network interface module 112 supports several, alternative data links 28, and network interface modules 112 communicate data packets to data links 28 selected according to either the data packets' destination address or control information received from management module 100.

In a first mode of operation, management module 100 configures gateway 18 at start-up. According to the subscriber profiles stored in memory 102, management module 100 selects a combination of TIMs 104, echo cancellation modules 106, compression modules 108, packetization modules 110, and network interface modules 112 to service each subscriber. Management module 100 then establishes a communication path for each subscriber among the selected combination of TIMs 104, echo cancellation modules 106, compression modules 108, packetization modules 110, and network interface modules 112. In the illustrated embodiment, management module 100 assigns each subscriber one or more time slots in TDM bus 114 for communicating telecommunication information among TIMs 104, echo cancellation modules 106, compression modules 108, and packetization modules 110. To implement the configuration, management module 100 communicates control information to TIMs 104, echo cancellation modules 106, compression modules 108, packetization modules 110, and network interface modules 112.

In a second mode of operation, management module 100 dynamically configures gateway 18 in response to receiving telecommunication information from switch 16 or customer premises 14. When gateway 18 receives telecommunication information, management module 100 identifies a subscriber associated with the telecommunication information and then configures gateway 18 to process and communicate the telecommunication information according to the subscriber's stored profile. Management module 100 selects a combination of TIMs 104, echo cancellation modules 106, compression modules 108, packetization modules 110, and network interface modules 112 to process the telecommunication information and then establishes a communication path among the selected combination of TIMs 104, echo cancellation modules 106, compression modules 108, packetization modules 110, and network interface modules 112.

In a particular embodiment, the subscriber profiles indicate a telecommunication interface 26, a compression algorithm, a data communication protocol, and a data link 28 associated with each subscriber. To configure gateway 18, management module 100 selects, for each subscriber, TIM 104 coupled to associated interface 26, compression module 108 that supports the associated compression algorithm, packetization module 110 that supports the associated data communication protocol, and network interface module 112 coupled to associated data link 18. In addition, if a subscriber profile indicates that gateway 18 should perform echo cancellation on a subscriber's telecommunication information, management module 100 selects one of echo cancellation modules 106 to service the subscriber.

Although the particular embodiment of gateway 18 described in detail with reference to FIG. 5 includes management module 100, memory 102, TIMs 104, echo cancellation modules 106, compression modules 108, packetization modules 110, and network interface modules 112, gateway 18 may include any combination of hardware, software, or hardware and software that communicates telecommunication information using several, alternative telecommunication interfaces 26, data compression algorithms, data communication protocols, and data links 28. For example, in an alternative embodiment, a single module may perform a combination of echo cancellation, compression, and packetization.

FIG. 6 illustrates a configuration 150 of telecommunication interface modules 104, echo cancellation modules 106, compression modules 108, packetization modules 110, and network interface modules 112. Using configuration 150, gateway 18 may communicate telecommunication information using several alternative telecommunication interfaces 26, data compression algorithms, data communication protocols, and data links 28. As illustrated, each telecommunication interface module 104 supports a separate type of interface 26, each compression module 108 supports a separate compression algorithm, each packetization module 110 supports a separate data communication protocol, and each network interface module 112 supports a separate data link 28.

To ensure that gateway 18 processes and communicates each subscriber's telecommunication information using the proper communication, compression, and broadband technologies, management module 100 selects a combination of TIMs 104, echo cancellation modules 106, compression modules 108, packetization modules 110, and network interface modules 112 to service each subscriber according to the subscriber profiles stored in memory 102. In a particular embodiment, the subscriber profiles identify a telecommunication interface 26, a compression algorithm, a data communication protocol, and a data link 28 associated with each subscriber. To service each subscriber, management module 100 selects TIM 104 coupled to associated interface 26, compression module 108 that supports the associated compression algorithm, packetization module 110 that supports the associated data communication protocol, and network interface module 112 coupled to associated data link 18. In addition, if a subscriber profile indicates that the gateway 18 should perform echo cancellation on a subscriber's telecommunication information, management module 100 selects one of echo cancellation modules 106 to service the subscriber. In an alternative embodiment, the subscriber profiles identify a combination of TIMs 104, echo cancellation modules 106, compression modules 108, packetization modules 110, and network interface modules 112 to service each subscriber.

Although the particular embodiment illustrated in FIG. 6 includes TIMs 104, echo cancellation modules 106, compression modules 108, packetization modules 110, and network interface modules 112 that use particular telecommunication, compression, and broadband technologies, gateway 18 may include any combination of TIMs 104, echo cancellation modules 106, compression modules 108, packetization modules 110, and network interface modules 112 that use any number of alternative telecommunication, compression, and broadband technologies.

FIG. 7 illustrates a table 200 of subscriber profiles relating to gateway 18. Management module 100 stores the subscriber profiles in memory 102 using arrays, linked lists, pointers, or any other suitable data programming techniques. Because gateway 18 supports several, alternative interfaces 26, compression algorithms, data communication protocols, and data links 28, gateway 18 uses the subscriber profiles to process and communicate each subscriber's telecommunication information using the proper telecommunication, compression, and broadband technologies.

Column 202 identifies the subscribers serviced by gateway 18. Although the subscriber identifiers in column 202 are telephone numbers, gateway 18 may use names, addresses, telephone numbers, or any other suitable information to identify subscribers. Columns 204, 208, 210, and 212 associate each subscriber with one of interfaces 26, a compression algorithm, a data communication protocol, and one of data links 28, respectively. Column 206 indicates whether gateway 18 should perform echo cancellation on each subscriber's telecommunication information, and column 211 indicates each subscriber's assigned quality of service. Column 214 includes the subscribers' assigned time slots in TDM bus 114. Although table 200 includes only one time slot per subscriber, gateway 18 may assign each subscriber several time slots in alternative embodiments. Column 216 indicates a data network address for each subscriber's data packets, and column 218 indicates the type of platform communicating each subscriber's data packets. Column 220 lists the subscribers' names.

Management module 100 uses the subscriber profiles in table 200 to configure gateway 18. Using the subscriber profiles, management module 100 selects a combination of TIMs 104, echo cancellation modules 106, compression modules 108, packetization modules 110, and network interface modules 112 to service each subscriber. For each subscriber, management module 100 selects TIM 104 coupled to the subscriber's associated interface 26 in column 204, compression module 108 that supports the subscriber's associated compression algorithm in column 208, packetization module 110 that supports the subscriber's associated data communication protocol in column 210, and network interface module 112 coupled to the subscriber's associated data link 18 in column 212. In addition, if column 206 indicates that gateway 18 should perform echo cancellation on a subscriber's telecommunication information, management module 100 selects one of echo cancellation modules 106 to service the subscriber. As indicated in column 214, management module 100 also assigns each subscriber one or more time slots in TDM bus 114 for communicating telecommunication information among TIM 104, echo cancellation module 106, compression module 108, and packetization module 110. After configuration, gateway 18 processes and communicates subscribers' telecommunication information according the subscriber profiles.

To communicate telecommunication information from switch 16 to customer premises 14, one of TIMs 104 receives telecommunication information from switch 16 and identifies a subscriber associated with the telecommunication information. In a particular embodiment, TIM 104 identifies the subscriber based on interface 26 from which TIM 104 received the telecommunication information. For example, if TIM 104 receives telecommunication information from analog line 26a, TIM 104 can identify Jane Doe as the subscriber associated with the telecommunication information using column 204. In an alternative embodiment, TIM 104 receives a subscriber identifier in conjunction with the telecommunication information and uses column 202 to identify the subscriber associated with the telecommunication information. After identifying the subscriber, TIM 104 communicates the telecommunication information to TDM bus 114 using the subscriber's assigned time slot in column 214.

If column 206 indicates that gateway 18 should perform echo cancellation on the subscriber's telecommunication information, one of echo cancellation modules 106 receives the telecommunication information from TDM bus 114 using the subscriber's assigned time slot in column 214, performs echo cancellation on the telecommunication information, and communicates the telecommunication information back to the subscriber's assigned time slot in column 214.

If column 208 includes a compression algorithm associated with the subscriber, then one of compression modules 108 receives the telecommunication information from TDM bus 114 using the subscriber's assigned time slot in column 214, compresses the telecommunication information using the compression algorithm indicated in column 208, and communicates the compressed telecommunication information back to the subscriber's assigned time slot in column 214.

One of packetization modules 110 receives the telecommunication information from TDM bus 114 using the subscriber's assigned time slot in column 214. Packetization module 110 then generates data packets encapsulating the telecommunication information according to the data communication protocol indicated in column 210, assigns the data packets the subscriber's data network address indicated in column 216, and communicates the data packets to one of network interface modules 112 using data packet bus 118. In a particular embodiment, packetization module 110 sets priority bits in the data packets according to the subscriber's assigned quality of service in column 211. Network interface module 112 receives the data packets and communicates the data packets to the subscriber's data link 28 indicated in column 212.

To communicate telecommunication information from customer premises 14 to switch 16, one of network interface modules 112 receives data packets from DSLAM 20, CMTS 52, or BSC 72. Network interface module 112 communicates the data packets to one of packetization modules 110 using data packet bus 118. Packetization module 110 extracts telecommunication information from the data packets and identifies a subscriber associated with the telecommunication information. In a particular embodiment, packetization module 110 uses the data packets' destination or source address to identify the subscriber according to column 216. In an alternative embodiment, packetization module 110 uses a subscriber identifier included in the data packets to identify the subscriber according to column 202. After identifying the subscriber, packetization module 110 communicates the telecommunication information to TDM bus 114 using the subscriber's assigned time slot in column 214. If column 208 includes a compression algorithm associated with the subscriber, then one of compression modules 108 receives the telecommunication information from TDM bus 114 using the subscriber's assigned time slot in column 214, de-compresses the telecommunication information using the compression algorithm indicated in column 208, and communicates the de-compressed telecommunication information back to the subscriber's assigned time slot in column 214. One of TIMs 104 receives the telecommunication information from TDM bus 114 using the subscriber's assigned time slot in column 214 and communicates the telecommunication to switch 16 using interface 26 in column 204.

Although a particular type of subscriber profile is described with reference to FIG. 7, gateway 18 may operate using many, alternative types of subscriber profiles. In addition, gateway 18 may use the subscriber profiles in many alternative ways. For example, in a particular embodiment, TIMs 104, echo cancellation modules 106, compression modules 108, packetization modules 110, and network interface modules 112 directly access the subscriber profiles stored in memory 102. In an alternative embodiment, management module 100 accesses the subscriber profiles and communicates control information to TIMs 104, echo cancellation modules 106, compression modules 108, packetization modules 110, and network interface modules 112 according to the subscriber profiles.

Figure 8A:
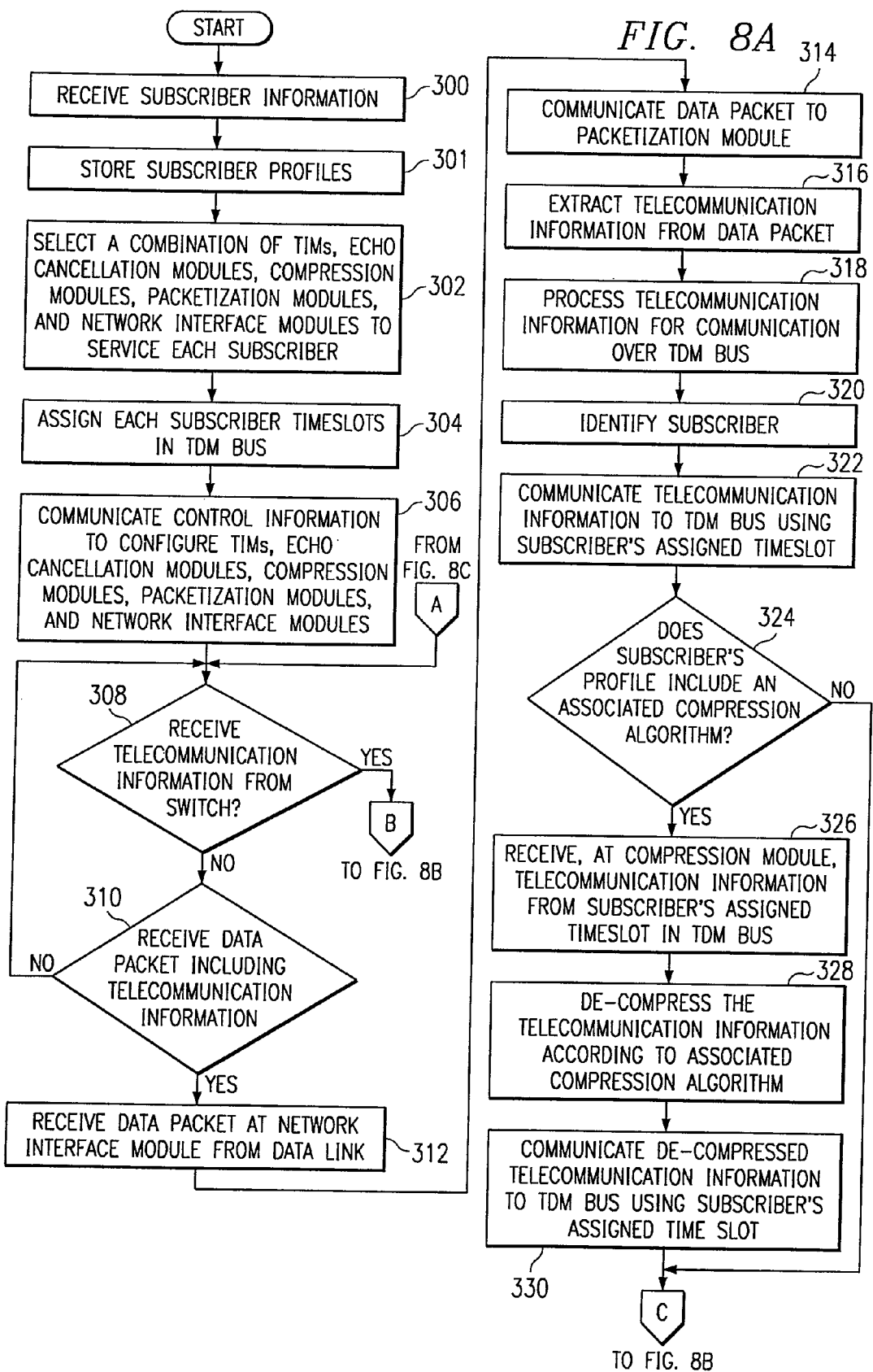
FIGS. 8A, 8B, and 8C illustrate a flowchart of a method of communicating telecommunication information using several, alternative telecommunication interfaces, data compression algorithms, data communication protocols, and data links.
Figure 8B:
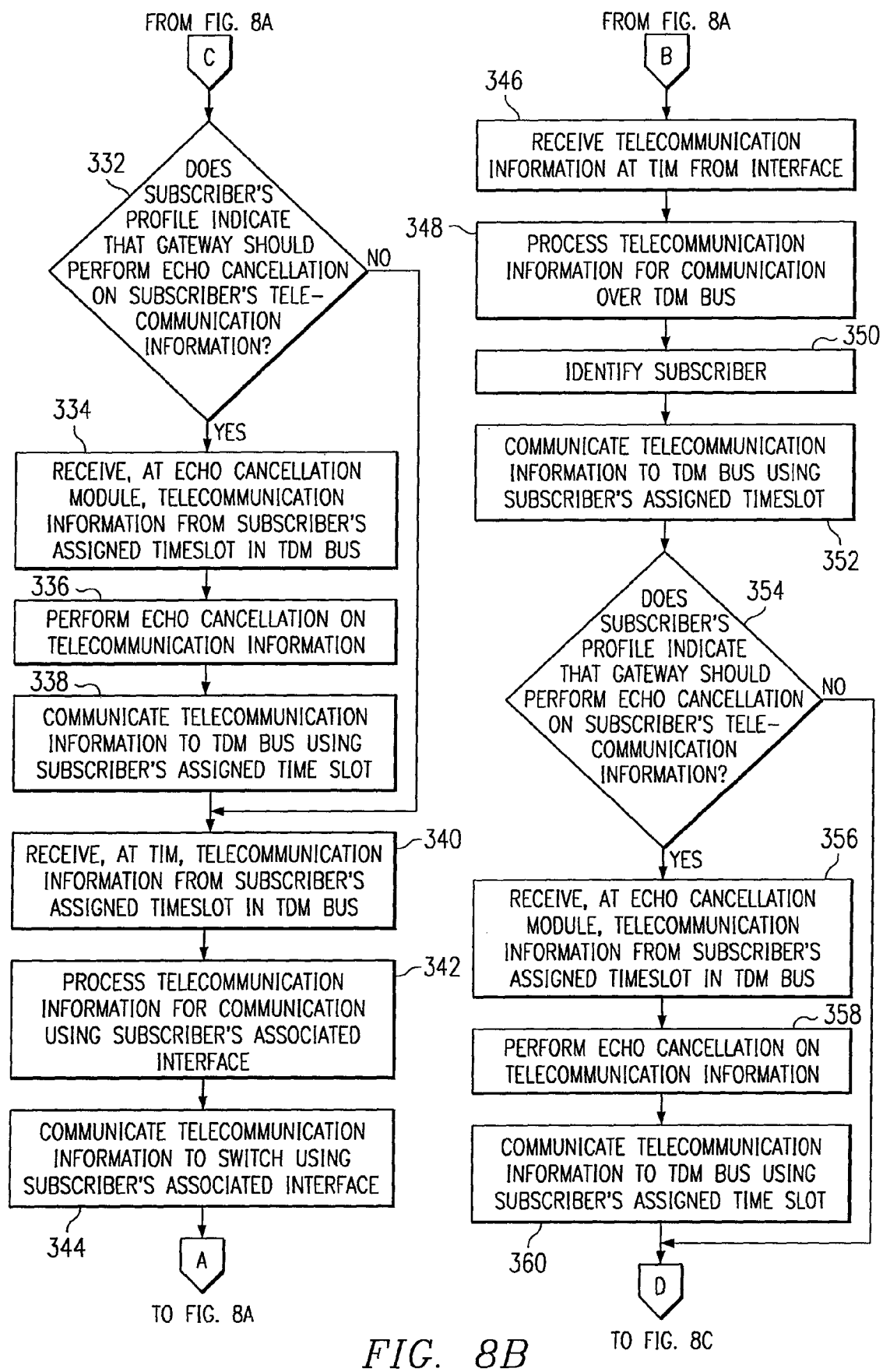
Figure 8C:
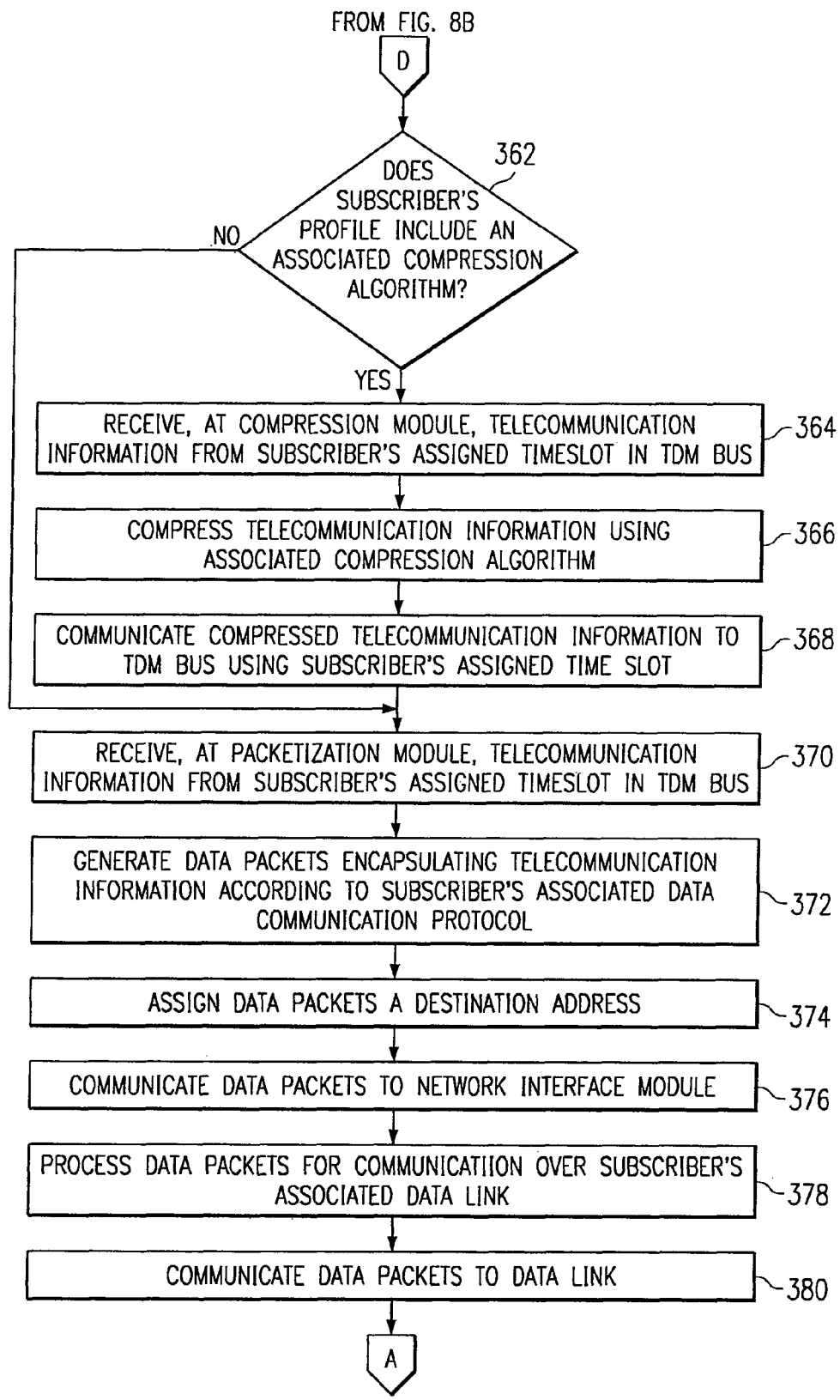

FIGS. 8A, 8B, and 8C illustrate a flowchart of a method of communicating telecommunication information using several, alternative telecommunication interfaces 26, data compression algorithms, data communication protocols, and data links 28. The method begins at step 300, where management module 100 receives subscriber information. The subscriber information indicates combinations of telecommunication interfaces 26, data compression algorithms, data communication protocols, and data links 28 that gateway 18 should use in servicing either individual subscribers or groups of subscribers. In a particular embodiment, the subscriber information also indicates the subscribers' assigned quality of service and whether gateway 18 should perform echo cancellation on the subscribers' telecommunication information. Management module 100 stores subscriber profiles in memory 102 according to the received subscriber information at step 301.

Management module 100 configures gateway 18 at steps 302-306. At step 302, management module 100 selects a combination of TIMs 104, echo cancellation modules 106, compression modules 108, packetization modules 110, and network interface modules 112 to service each subscriber. At step 304, management module 100 assigns each subscriber one or more time slots in TDM bus 114 for communicating telecommunication information among selected TIMs 104, echo cancellation modules 106, compression modules 108, and packetization modules 110. Management module 100 then communicates control information to TIMs 104, echo cancellation modules 106, compression modules 108, packetization modules 110, and network interface modules 112 at step 306.

Once configured, gateway 18 communicates telecommunication information between switch 16 and customer premises equipment 14. If one of TIMs 104 receives telecommunication information from switch 16 at step 308, the method continues by simultaneously or in series, as appropriate, performing steps 346-380. If one of network interface modules 112 receives a data packet including telecommunication information from DSLAM 20, CMTS 52, BSC 72, or other broadband data communication device at step 310, the method continues by simultaneously or in series, as appropriate, performing steps 312-344.

Using steps 312-344, gateway 18 communicates telecommunication information from a DSL, cable, wireless, or other type of broadband platform to switch 16. Network interface module 112 receives a data packet from one of data links 28 at step 312 and communicates the data packet to one of packetization modules 110 at step 314. Packetization module 110 extracts telecommunication information from the data packet at step 316 and processes the telecommunication information for communication over TDM bus 114 at step 318. At step 320, packetization module 110 identifies the subscriber associated with the telecommunication information based on the data packet's source or destination address or a subscriber identifier encapsulated in the data packet. Packetization module 110 communicates the telecommunication information to TDM bus 114 using the subscriber's assigned time slot at step 322.

If the subscriber's profile includes an associated compression algorithm at step 324, one of compression modules 108 receives the telecommunication information from the subscriber's assigned time slot in TDM bus 114 at step 326. Compression module 108 de-compresses the telecommunication information using the subscriber's associated compression algorithm at step 328 and communicates the de-compressed telecommunication information to TDM bus 114 using the subscriber's assigned time slot at step 330.

If the subscriber's profile indicates that gateway 18 should perform echo cancellation on the subscriber's telecommunication information at step 332, one of echo cancellation modules 106 receives the telecommunication information from the subscriber's assigned time slot in TDM bus 114 at step 334. Echo cancellation module 106 performs echo cancellation on the telecommunication information to isolate and filter unwanted signal reflections at step 336 and communicates the telecommunication information to TDM bus 114 using the subscriber's assigned time slot at step 338.

One of TIMs 104 receives the telecommunication information from the subscriber's assigned time slot in TDM bus 114 at step 340. TIM 104 processes the telecommunication information for communication using the subscriber's associated interface 26 at step 342 and communicates the telecommunication information to switch 16 using the subscriber's associated interface 26 at step 344. After steps 312-344, the method continues at step 308.

Using steps 346-380, gateway 18 communicates telecommunication information from switch 16 to a DSL, cable, wireless, or other suitable type of broadband platform. At step 346, one of TIMs 104 receives telecommunication information from one of interfaces 26. TIM 104 processes the telecommunication information for communication over TDM bus 114 at step 348 and identifies the subscriber associated with the telecommunication information at step 350. In a particular embodiment, TIM 104 receives the telecommunication information from one of unbundled analog lines 26a, and TIM 104 identifies the subscriber associated with unbundled analog line 26a as the intended recipient of the telecommunication information. In an alternative embodiment, TIM 104 receives the telecommunication information from a GR-303, TR-8, SS7, V5, ISDN, or other suitable digital interface 26, and TIM 104 identifies the subscriber that is the intended recipient of the telecommunication information according to a subscriber identifier received from switch 16. After identifying the subscriber, TIM 104 communicates the telecommunication information to TDM bus 114 using the subscriber's assigned time slot at step 352.

If the subscriber's profile indicates that gateway 18 should perform echo cancellation on the subscriber's telecommunication information at step 354, one of echo cancellation modules 106 receives the telecommunication information from the subscriber's assigned time slot in TDM bus 114 at step 356. Echo cancellation module 106 performs echo cancellation on the telecommunication information to isolate and filter unwanted signal reflections at step 358 and communicates the telecommunication information to TDM bus 114 using the subscriber's assigned time slot at step 360.

If the subscriber's profile includes an associated compression algorithm at step 362, one of compression modules 108 receives the telecommunication information from the subscriber's assigned time slot in TDM bus 114 at step 364. Compression module 108 compresses the telecommunication information using the subscriber's associated compression algorithm at step 366 and communicates the compressed telecommunication information to TDM bus 114 using the subscriber's assigned time slot at step 368.

One of packetization modules 110 receives the telecommunication information from the subscriber's assigned time slot in TDM bus 114 at step 370. Packetization module 110 generates data packets encapsulating the telecommunication information according to the subscriber's associated data communication protocol at step 372. Packetization module 110 assigns the data packets the subscriber's data network address at step 374 and communicates the data packets to one of network interface modules 112 at step 376.

Network interface module 112 processes the data packets for communication over the subscriber's associated data link 28 at step 378 and communicates the data packets to data link 28 at step 380. After steps 346-380, the method returns to step 308.

Although an embodiment of the invention and its advantages are described in detail, a person skilled in the art could make various alterations, additions, and omissions without departing from the spirit and scope of the present invention as defined by the appended claims.

What is claimed is:

1. A gateway for communicating telecommunication information, comprising:
   one or more packetization modules operable to receive first data packets from a first broadband network using a first data communications protocol and to extract first telecommunication information associated with a first subscriber from the first data packets, the packetization modules further operable to receive second data packets from a second broadband network using a second data communication protocol and to extract second telecommunication information associated with a second subscriber from the second data packets, wherein the first and second broadband networks include any of digital subscriber line, cable, and wireless platforms, wherein the first and second data communication protocols includes any of Internet Protocol, Asynchronous Transfer Mode, and Frame Relay protocols, wherein the gateway is operable to receive packets from the first subscriber via a first network access device comprising one of a digital subscriber line multiplexer (DSLAM), a cable modem termination system (CMTS), and a base station controller (BSC) external to the gateway using the first data communication protocol in the first broadband network and receives packets from the second subscriber via a second network access device comprising one of a DSLAM, a CMTS, and a BSC external to the gateway using the second data communication protocol in the second broadband network, the second network access device being of a different type from the first network access device.

2. The gateway of claim 1, further comprising one or more compression modules operable to de-compress the first telecommunication information using a first compression algorithm associated with the first subscriber and to de-compress the second telecommunication information using a second compression algorithm associated with the second subscriber.

3. The gateway of claim 2, further comprising a management module operable to select a first one of the compression modules supporting the first compression algorithm for de-compressing the first subscriber's telecommunication information and a second one of the compression modules supporting the second compression algorithm for de-compressing the second subscriber's telecommunication information.

4. The gateway of claim 1, wherein the packetization modules receive the first data packets from a digital subscriber line multiplexer (DSLAM) and the second data packets from a cable modem termination system (CMTS) or a base station controller (BSC).

5. The gateway of claim 1, further comprising:
   a data packet bus operable to communicate the first data packets to the packetization module supporting the first data communication protocol; and
   a time division multiplexing (TDM) bus operable to communicate the first telecommunication information to a telecommunication interface module coupled to the packetization modules.

6. The gateway of claim 1, further comprising one or more echo cancellation modules operable to perform echo cancellation on the first telecommunication information but not the second telecommunication information.

7. A gateway for communicating telecommunication information, comprising:
   one or more packetization modules operable to receive first data packets from a first broadband network using a first data communications protocol and to extract first telecommunication information associated with a first subscriber from the first data packets, the packetization modules further operable to receive second data packets from a second broadband network using a second data communication protocol and to extract second telecommunication information associated with a second subscriber from the second data packets, wherein the first and second broadband networks include any of digital subscriber line, cable, and wireless platforms, wherein the first and second data communication protocols includes any of Internet Protocol, Asynchronous Transfer Mode, and Frame Relay protocols, wherein the gateway is operable to receive packets from the first subscriber via a first network access device comprising one of a digital subscriber line multiplexer (DSLAM), a cable modem termination system (CMTS), and a base station controller (BSC) external to the gateway using the first data communication protocol in the first broadband network and receives packets from the second subscriber via a second network access device comprising one of a DSLAM, a CMTS, and a BSC external to the gateway using the second data communication protocol in the second broadband network, the second network access device being of a different type from the first network access device; and
   one or more telecommunication interface modules operable to communicate the first telecommunication information to a telecommunication network using a first telecommunication interface format associated with the first subscriber and to communicate the second telecommunication information to the telecommunication network using a second telecommunication interface format associated with the second subscriber, the first and second telecommunication interface formats including any of GR-303, TR-8, SS7, V5, ISDN, and unbundled analog lines.

8. The gateway of claim 7, further comprising a management module operable to assign at least one time slot of a time division multiplexing (TDM) bus to communicate the first telecommunication information to a particular telecommunication interface module coupled to the packetization modules.

9. A method for communicating telecommunication information, comprising:
   at a gateway:
   receiving first data packets from a first broadband network using a first data communication protocol;
   extracting first telecommunication information associated with a first subscriber from the first data packets;
   receiving second data packets from a second broadband network using a second data communication protocol;

extracting second telecommunication information associated with a second subscriber from the second data packets;

wherein the first and second broadband networks include any of digital subscriber line, cable, and wireless platforms, wherein the first and second data communication protocols includes any of Internet Protocol, Asynchronous Transfer Mode, and Frame Relay protocols, wherein the gateway is operable to receive packets from the first subscriber via a first network access device comprising one of a digital subscriber line multiplexer (DSLAM), a cable modem termination system (CMTS), and a base station controller (BSC) external to the gateway using the first data communication protocol in the first broadband network and receives packets from the second subscriber via a second network access device comprising one of a DSLAM, a CMTS, and a BSC external to the gateway using the second data communication protocol in the second broadband network, the second network access device being of a different type from the first network access device.

10. The method of claim 9, further comprising:
de-compressing the first telecommunication information using a first compression algorithm associated with the first subscriber; and
de-compressing the second telecommunication information using a second compression algorithm associated with the second subscriber.

11. The method of claim 10, further comprising:
storing a first subscriber profile associating the first subscriber with the first compression algorithm; and
storing a second subscriber profile associating the second subscriber with the second compression algorithm.

12. The method of claim 10, further comprising:
selecting a first compression module supporting the first compression algorithm for de-compressing the first telecommunication information; and
selecting a second compression module supporting the second compression algorithm for de-compressing the second telecommunication information.

13. The method of claim 9, further comprising:
assigning one or more time slots in a time division multiplexing (TDM) bus to communicate the first telecommunication information.

14. The method of claim 9, further comprising:
receiving the first data packets from a digital subscriber line multiplexer (DSLAM); and
receiving the second data packets from a cable modem termination system (CMTS) or a base station controller (BSC).

15. The method of claim 9, further comprising:
performing echo cancellation on the first telecommunication information; and bypassing echo cancellation for the second telecommunication information.

16. A method for communicating telecommunication information, comprising:
at a gateway:
receiving first data packets from a first broadband network using a first data communication protocol;
extracting first telecommunication information associated with a first subscriber from the first data packets;
receiving second data packets from a second broadband network using a second data communication protocol;
extracting second telecommunication information associated with a second subscriber from the second data packets;

wherein the first and second broadband networks include any of digital subscriber line, cable, and wireless platforms, wherein the first and second data communication protocols includes any of Internet Protocol, Asynchronous Transfer Mode, and Frame Relay protocols, wherein the gateway is operable to receive packets from the first subscriber via a first network access device comprising one of a digital subscriber line multiplexer (DSLAM), a cable modem termination system (CMTS), and a base station controller (BSC) external to the gateway using the first data communication protocol in the first broadband network and receives packets from the second subscriber via a second network access device comprising one of a DSLAM, a CMTS, and a BSC external to the gateway using the second data communication protocol in the second broadband network, the second network access device being of a different type from the first network access device;

communicating the first telecommunication information to a telecommunication network using a first interface format associated with the first subscriber;

communicating the second telecommunication information to the telecommunication network using a second interface format associated with the second subscriber; and wherein, the first and second interface formats include any of GR-303, TR-8, SS7, V5, ISDN, and unbundled analog lines.

17. A system for communicating telecommunication information, comprising:
at a gateway:
means for receiving first data packets from a first broadband network using a first data communication protocol;
means for extracting first telecommunication information associated with a first subscriber from the first data packets;
means for receiving second data packets from a second broadband network using a second data communication protocol;
means for extracting second telecommunication information associated with a second subscriber from the second data packets;
wherein the first and second broadband networks include any of digital subscriber line, cable, and wireless platforms, wherein the first and second data communication protocols includes any of Internet Protocol, Asynchronous Transfer Mode, and Frame Relay protocols, wherein the gateway is operable to receive packets from the first subscriber via a first network access device comprising one of a digital subscriber line multiplexer (DSLAM), a cable modem termination system (CMTS), and a base station controller (BSC) external to the gateway using the first data communication protocol in the first broadband network and receives packets from the second subscriber via a second network access device comprising one of a DSLAM, a CMTS, and a BSC external to the gateway using the second data communication protocol in the second broadband network, the second network access device being of a different type from the first network access device.

18. The system of claim 17, further comprising:
  means for de-compressing the first telecommunication information using a first compression algorithm associated with the first subscriber; and
  means for de-compressing the second telecommunication information using a second compression algorithm associated with the second subscriber.

19. The method of claim 17, further comprising:
  performing echo cancellation on the first telecommunication information; and
  bypassing echo cancellation for the second telecommunication information.

20. A system for communicating telecommunication information, comprising:
  at a gateway:
    means for receiving first data packets from a first broadband network using a first data communication protocol;
    means for extracting first telecommunication information associated with a first subscriber from the first data packets;
    means for receiving second data packets from a second broadband network using a second data communication protocol;
    means for extracting second telecommunication information associated with a second subscriber from the second data packets;
  wherein the first and second broadband networks include any of digital subscriber line, cable, and wireless platforms, wherein the first and second data communication protocols includes any of Internet Protocol, Asynchronous Transfer Mode, and Frame Relay protocols, wherein the gateway is operable to receive packets from the first subscriber via a first network access device comprising one of a digital subscriber line multiplexer (DSLAM), a cable modem termination system (CMTS), and a base station controller (BSC) external to the gateway using the first data communication protocol in the first broadband network and receives packets from the second subscriber via a second network access device comprising one of a DSLAM, a CMTS, and a BSC external to the gateway using the second data communication protocol in the second broadband network, the second network access device being of a different type from the first network access device;
    means for communicating the first telecommunication information to a telecommunication network using a first interface format associated with the first subscriber;
    means for communicating the second telecommunication information to the telecommunication network using a second interface format associated with the second subscriber; and
  wherein, the first and second interface formats include any of GR-303, TR-8, SS7, V5, ISDN, and unbundled analog lines.

* * * * *